US009768503B2

(12) United States Patent
Klemes

(10) Patent No.: US 9,768,503 B2
(45) Date of Patent: Sep. 19, 2017

(54) SYSTEM AND METHOD FOR SIMPLE 2D PHASE-MODE ENABLED BEAM-STEERING

(71) Applicant: Huawei Technologies Co., Ltd., Shenzhen (CN)

(72) Inventor: Marek Klemes, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 562 days.

(21) Appl. No.: 14/295,235

(22) Filed: Jun. 3, 2014

(65) Prior Publication Data

US 2015/0349422 A1     Dec. 3, 2015

(51) Int. Cl.
| | | |
|---|---|---|
| *H01Q 3/36* | (2006.01) | |
| *G01S 3/42* | (2006.01) | |
| *H01Q 3/26* | (2006.01) | |
| *H01Q 21/00* | (2006.01) | |
| *H01Q 21/20* | (2006.01) | |

(52) U.S. Cl.
CPC .............. *H01Q 3/36* (2013.01); *G01S 3/42* (2013.01); *H01Q 3/2605* (2013.01); *H01Q 21/0006* (2013.01); *H01Q 21/20* (2013.01)

(58) Field of Classification Search
CPC .... H01Q 3/2605; H01Q 3/36; H01Q 21/0006; H01Q 21/20; G01S 3/42; G01S 3/14; G01S 3/38
See application file for complete search history.

(56) References Cited

U.S. PATENT DOCUMENTS

| | | | | |
|---|---|---|---|---|
| 3,311,916 A | * | 3/1967 | Packard ................. | G01S 13/44 342/363 |
| 3,789,417 A | * | 1/1974 | Coleman ................. | H01Q 3/40 342/373 |
| 5,506,592 A | * | 4/1996 | MacDonald ......... | H01Q 21/205 343/795 |
| 5,767,814 A | * | 6/1998 | Conroy ................... | H01Q 3/40 343/774 |
| 6,104,346 A | * | 8/2000 | Rudish ..................... | G01S 3/04 342/156 |
| 6,992,622 B1 | * | 1/2006 | Chiang ................... | H01Q 3/40 342/373 |

(Continued)

OTHER PUBLICATIONS

Al-Khatib, H. H., et al., "A Gain Optimizing Algorithm for Adaptive Arrays," Antennas and Propagation, IEEE Transactions, vol. 26, No. 2, Mar. 1978, pp. 228-235.

(Continued)

*Primary Examiner* — Cassie Galt
(74) *Attorney, Agent, or Firm* — Slater Matsil, LLP

(57) ABSTRACT

A method for operating a beam-steering system includes receiving a signal to be tracked, generating a first phase-mode signal, a second phase-mode signal and a third phase-mode signal from the received signal, and generating a first intermediate auxiliary signal, a second intermediate auxiliary signal, and a first intermediate main signal in accordance with the phase-mode signals. The method also includes deriving a first steering signal proportional to a circumferential steering angle of the received signal from the first intermediate main signal and the first auxiliary signal, and deriving a second steering signal proportional to a radial steering angle of the received signal from the second intermediate auxiliary signal and the first intermediate main signal.

30 Claims, 19 Drawing Sheets

(56) References Cited

U.S. PATENT DOCUMENTS

| | | |
|---|---|---|
| 2005/0285784 A1 | 12/2005 | Chiang et al. |
| 2006/0114158 A1 | 6/2006 | Chiang et al. |
| 2009/0033575 A1 | 2/2009 | Dybdal et al. |
| 2013/0234890 A1 | 9/2013 | Chethik et al. |

OTHER PUBLICATIONS

Chang, C.C. et al., "Design of Beam Switching/Steering Butler Matrix for Phased Array System," IEEE Transactions on Antennas and Propogation, vol. 58, Issue 2, Feb. 2010, pp. 367-374.

Cvetkovic, M., "A Four Element Circular Array Direction Finding and Null Steering System," Antennas and Propagation, 1989. ICAP 89., Sixth International Conference, vol. 1, Toronto, Apr. 4-7, 1989, pp. 168-172.

Davies, D.E.N., "Electronic steering of multiple nulls for circular arrays," Electronic Letters, vol. 13, Issue 22, Oct. 27, 1977, pp. 669-670.

Dufort, E. C., "High-Resolution Emitter Direction Finding Using a Phased Array Antenna," IEEE Transactions on Acoustics, Speech, and Signal Processing, vol. ASSP-3, No. 6, Dec. 1993, pp. 1409-1416.

Gross, F., "Smart Antennas for Wireless Communications with Matlab," The McGraw-Hill Companies, Inc., Sep. 2005, 288 pages.

Khanna, R. et al., "Adaptive Beam Forming Using a Cascade Configuration," IEEE Transactions on Acoustics, Speech, and Signal Processing, vol. 31, Issue 4, Aug. 1983, pp. 940-945.

Ko, C.C., "Adaptive array processing using the Davies beamformer," IEEE Proceedings, Microwaves, Antennas & Propagation, vol. 133, Pt. H, Issue 6, Dec. 1986, pp. 467-473.

Mohamadi, F., "Wafer-scale integration brings low cost and a small footprint to active antenna arrays," www.rfdesign.com, Feb. 2005, pp. 48-64.

Moulder, W. et al., "60-GHz Two-Dimensionally Scanning Array Employing Wideband Planar Switched Beam Network," IEEE Antennas and Wireless Propagation Letters, vol. 9, 2010-00-00, 4 pages.

Sheleg, B., "A Matrix-Fed Circular Array for Continuous Scanning," Proceedings of the IEEE, vol. 56, Issue 11, Nov. 1968, 13 pages.

Sibille, A. et al., "Beam Steering Circular Monopole Arrays for Wireless Applications," 10th International Conference on Antennas and Propogation, vol. 1, Apr. 14-17, 1997, pp. 358-361.

Tsang, C.S., et al., "A Time Delay Algorithm for Adaptive Arrays," Aerospace Applications Conference, 1996 Proceedings, Feb. 3-10, 1996, vol. 4, pp. 457-468.

Withers, M.J., et al., "Self-focusing receiving array," Electrical Engineers, Proceedings of the Institution, Sep. 1965, vol. 112, No. 9, pp. 1683,1688.

York, R. A., et al., "Injection- and Phase-Locking Techniques for Beam Control," IEEE Transactions on Microwave Theory and Techniques, vol. 46, No. 11, Nov. 1998, pp. 1920-1929.

Davies, et al., "A broadband experimental null-steering antenna system for mobile communications," 8054 Radio & Electron. Eng. vol. 48, No. 10, Oct. 1978, 9 pages.

\* cited by examiner

SYSTEM AND METHOD FOR SIMPLE 2D PHASE-MODE ENABLED BEAM-STEERING

TECHNICAL FIELD

The present disclosure relates generally to antennas and electromagnetic radiation modification, and more particularly to a system and method for simple two-dimensional (2D) phase-mode enabled beam-steering.

BACKGROUND

Beam-steering is the angular positioning of the main lobe of a radiation pattern. This allows for greater discrimination in favor of a desired signal from a point-like source in the far field of the antenna, for sensing or information transmission and reception. When it is required to steer the beam of a planar array antenna over a limited range in 2 dimensions around the array axis (which is perpendicular to the plane of the array), it becomes difficult to fit each element with a variable phase shifter or transceiver module (TR), and incorporate them all into the feed structure as would be devised in the conventional approach. This is especially true where the wavelengths involved are small because the array elements and spacings scale with wavelength (must be in the order of half wavelength) whereas feed lines and phase shifters take up additional room and do not completely scale with wavelength, (especially TRs). In any case, the phase-shifters and TRs become very expensive for short wavelengths (e.g. millimeter-waves), so it is desirable to use as few of them as possible to achieve the necessary beam control.

SUMMARY OF THE DISCLOSURE

Example embodiments of the present disclosure which provide a system and method for simple two-dimensional (2D) phase-mode enabled beam-steering.

In accordance with an example embodiment of the present disclosure, a method for operating a beam-steering system is provided. The method includes receiving a signal to be tracked, generating a first phase-mode signal, a second phase-mode signal and a third phase-mode signal from the received signal, and generating a first intermediate auxiliary signal, a second intermediate auxiliary signal, and a first intermediate main signal in accordance with the phase-mode signals. The method also includes deriving a first steering signal proportional to a circumferential steering angle of the received signal from the first intermediate main signal and the first auxiliary signal, and deriving a second steering signal proportional to a radial steering angle of the received signal from the second intermediate auxiliary signal and the first intermediate main signal.

In accordance with another example embodiment of the present disclosure, a method for operating a beam-steering system is provided. The method includes generating, by the beam-steering system, a first auxiliary intermediate signal and a second auxiliary intermediate signal in accordance with a 1-st order phase-mode signal, and generating, by the beam-steering system, a first intermediate main signal in accordance with a 0-th order phase-mode signal. The method also includes producing, by the beam-steering system, a first steering signal in accordance with the first auxiliary intermediate signal and the first intermediate main signal to orient an array of antenna elements towards a source of the phase-mode signals in a circumferential dimension, and producing, by the beam-steering system, a third intermediate auxiliary signal and a second intermediate main signal in accordance with the first intermediate main signal and the second intermediate auxiliary signal. The method further includes producing, by the beam-steering system, a second steering signal in accordance with the third intermediate auxiliary signal and the second intermediate main signal to orient the array of antenna elements towards the source of the phase-mode signals in a radial dimension, and producing, by the beam-steering system, an output signal in accordance with the first intermediate auxiliary signal, the first intermediate main signal, and the second steering signal, the output signal corresponding to a maximum strength of the signal received by the array of antenna elements.

In accordance with another example embodiment of the present disclosure, a beam-steering control system is provided. The beam-steering control system includes a variable phase combiner, a phase shifting splitter, a first steering signal unit operatively coupled to the first auxiliary intermediate signal and the first intermediate main signal, a second variable ratio combiner operatively coupled to the first intermediate main signal and the second intermediate auxiliary signal, a second steering signal unit operatively coupled to the third intermediate auxiliary signal and the second intermediate main signal, and a first variable ratio combiner operatively coupled to the first intermediate auxiliary signal, the first intermediate main signal, and the second steering signal. The variable phase combiner generates a first auxiliary intermediate signal and a second auxiliary intermediate signal in accordance with at least one of a 1-st order phase-mode signal and a −1-st order phase-mode signal associated with a received signal. The phase shifting splitter generates a first intermediate main signal in accordance with a 0-th order phase-mode signal associated with the received signal. The first steering signal unit produces a first steering signal to orient an array of antenna elements towards a source of the received signal in a circumferential dimension. The second variable ratio combiner produces a third intermediate auxiliary signal and a second intermediate main signal. The second steering signal unit produces a second steering signal to orient the array of antenna elements towards the source of the received signal in a radial dimension. The first variable ratio combiner produces an output signal corresponding to a maximum strength of the signal received by the array of antenna elements.

In accordance with another example embodiment of the present disclosure, a beam-steering control system is provided. The beam-steering control system includes an array of antenna elements, a phase-mode generating unit operatively coupled to the array of antenna elements, a variable-phase combiner/splitter (VPC) operatively coupled to the phase-mode generating unit, a first steering signal unit operatively coupled to the VPC, and a second steering signal unit operatively coupled to the VPC. The array of antenna elements receives a signal to be tracked. The phase-mode generating unit generates a first phase-mode signal, a second phase-mode signal and a third phase-mode signal from the received signal. The VPC generates a first intermediate auxiliary signal, a second intermediate auxiliary signal, and a first intermediate main signal in accordance with the phase-mode signals. The first steering signal unit derives a first steering signal proportional to a circumferential steering angle of the received signal from the first intermediate main signal and the first auxiliary signal. The second steering signal unit derives a second steering signal proportional to a radial steering angle of the received signal from the second intermediate auxiliary signal and the first intermediate main signal.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
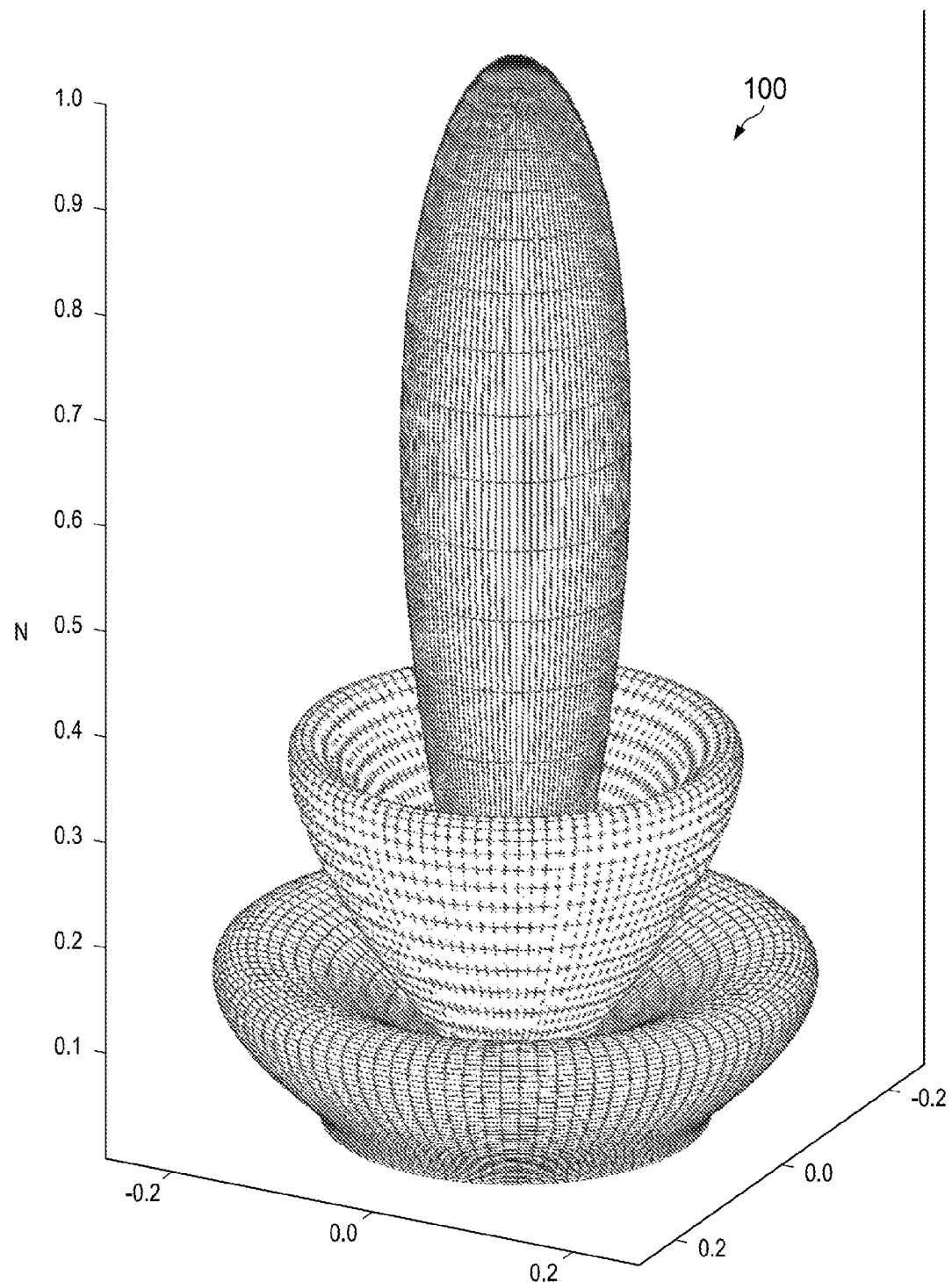
FIG. 1 illustrates a graph illustrating an example far-field pattern of 0-th order phase-mode $P_0$ of a 16 element, $\lambda/2$ spaced circular ring array according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

Disclosed herein is a two-dimensional (2D) phase-mode beam steering system that automatically achieves 2D steering of the electromagnetic (EM) radiation beam of a circular or polygonal ring array with an arbitrary number of antenna elements using a fixed number of variable phase shifters, hybrid splitter/combiners, mixers, and integrators. The fixed number of phase-modes is implemented in the feed structure of the antenna ring array. The different phase-modes may each use a separate concentric ring array of antennas or they may use a common ring array of antennas for any or all of the phase-modes. The number of variable phase shifters, hybrid splitter/combiners, mixers, and integrators is independent of the number of antenna elements used in the circular or polygonal ring array. The disclosed 2D phase-mode beam steering systems and methods may be connected to a phase-mode feed network. Additional information about phase-mode feed networks and about hybrid splitters/combiners may be found in Davies, D. E. N. and Rizk, M. S. A. S., "Electronic Steering of Multiple Nulls for Circular Arrays," Electronics Letters, Vol. 13, No. 22, pp. 669-670, 27 Oct. 1977, which is incorporated herein by reference in its entirety.

In an embodiment, the disclosed 2D phase-mode beam steering system achieves 2-dimensional steering of the beam of a circular ring array of any number of antenna elements using only 6 (or optionally 5) variable phase shifters and only 6 hybrid splitter/combiners. Only 3 (or optionally 2) phase-modes are required to be implemented in the feed structure of the circular ring array. They may each use a separate concentric ring array or a common one for any or all of the phase-modes. The 0-th order phase-mode may also use a filled planar polygonal array and the $+1$-st and $-1$-st phase-modes may use polygonal rings of elements on the periphery of this array; these variations of the geometry are to be understood as being implicit in the term "circular ring array" as used in this description.

Thus the disclosed systems and apparatuses have the potential to greatly reduce the complexity and cost of designing, fabricating and calibrating an electronically-steerable millimeter-wave array antenna. Such an antenna is desirable, for example, in a small-cell backhaul radio to enable automatic alignment of the point-to-point link, thus greatly reducing the link deployment time and cost.

In an embodiment, a beam-steering system includes an analog radio frequency (RF) beam-steering network connected to a circular ring array of radiating (or receiving) elements connected to a phase-mode feed network having output ports for the 0-th, 1-st and −1-st order phase-modes ($P_0$, $P_1$ and $P_{-1}$, respectively), and to a transceiver (with optionally one additional receiver input) at its output ports. The phase-mode inputs to the beam-steering network may be generated from separate concentric ring arrays, or from a single common ring array, having an arbitrary number of elements. The disclosed beam-steering network includes 2 phaseshifters connected to the $P_1$ and $P_{-1}$ phase-modes and controlled in opposite directions, $\theta$ and $-\theta$, respectively. These are in turn connected to a hybrid splitter/combiner which forms their sum at one output, $C=P_1 e^{j\theta}+P_{-1} e^{-j\theta}$, and difference at the other output, as $D=P_1 e^{j\theta}-P_{-1} e^{-j\theta}$. Output of mode $P_0$ is input to a compensating and 90° phaseshift network with the same insertion delay, loss and phase as the phase-shifters and hybrid of the other two phase-modes (when set to zero variable phases). Output D and the compensated $P_0$ mode are then input to another sum/difference hybrid, whose outputs C and D are connected to another two oppositely-adjustable phaseshifters, $\phi$ and $-\phi$, respectively. The outputs of these are then connected to the inputs of a third hybrid whose sum output port C gives the steered main beam for use in the main transceiver, and difference output D gives a steered auxiliary beam for use in an auxiliary receiver. Sum port output C of the first hybrid gives another independent auxiliary beam for use in a control circuit which generates a steering signal to control the circumferential ($\theta$) direction of the main beam.

In an embodiment, steering of the main beam in a limited range around the array axis (direction perpendicular to the plane of array) in the radial direction is accomplished with phase-setting of $\phi$, and in the circumferential direction with setting of $\theta$, independently is provided. The same structure of beam-steerer can be used with ring arrays having any number of elements.

The disclosed beam-steerers are herein described in greater detail of their principles of operation, in the context of a steerable millimeter-wave array antenna. Specifically, in an embodiment, the antenna includes a planar ring of identical radiating (or receiving) elements connected to a phase-mode beamforming network and radiating nominally in the direction orthogonal to the plane of the array (along the array axis).

In the case of an electromagnetic antenna, the array elements maybe of linear or circular polarizations. In the latter case, they may be arranged with their feedpoints symmetrically around the center, so that the phase will progress linearly around the circumference by one cycle, resulting in one of the 1-st order phase-modes. In an embodiment, phasing arrangements compensating for this phase-progression will form the 0-th order phase-mode. Other phase-mode feed arrangements for linearly-polarized elements may be devised, such as portions of a Butler matrix or Rotman lens, spatial or guided-mode feeds and other arrangements employed by those skilled in the art. In an embodiment, the end result is a phase-mode feed structure of a circular or polygonal ring array having output ports corresponding to the 0-th, +1-st and −1-st order phase-modes.

Figure 2:
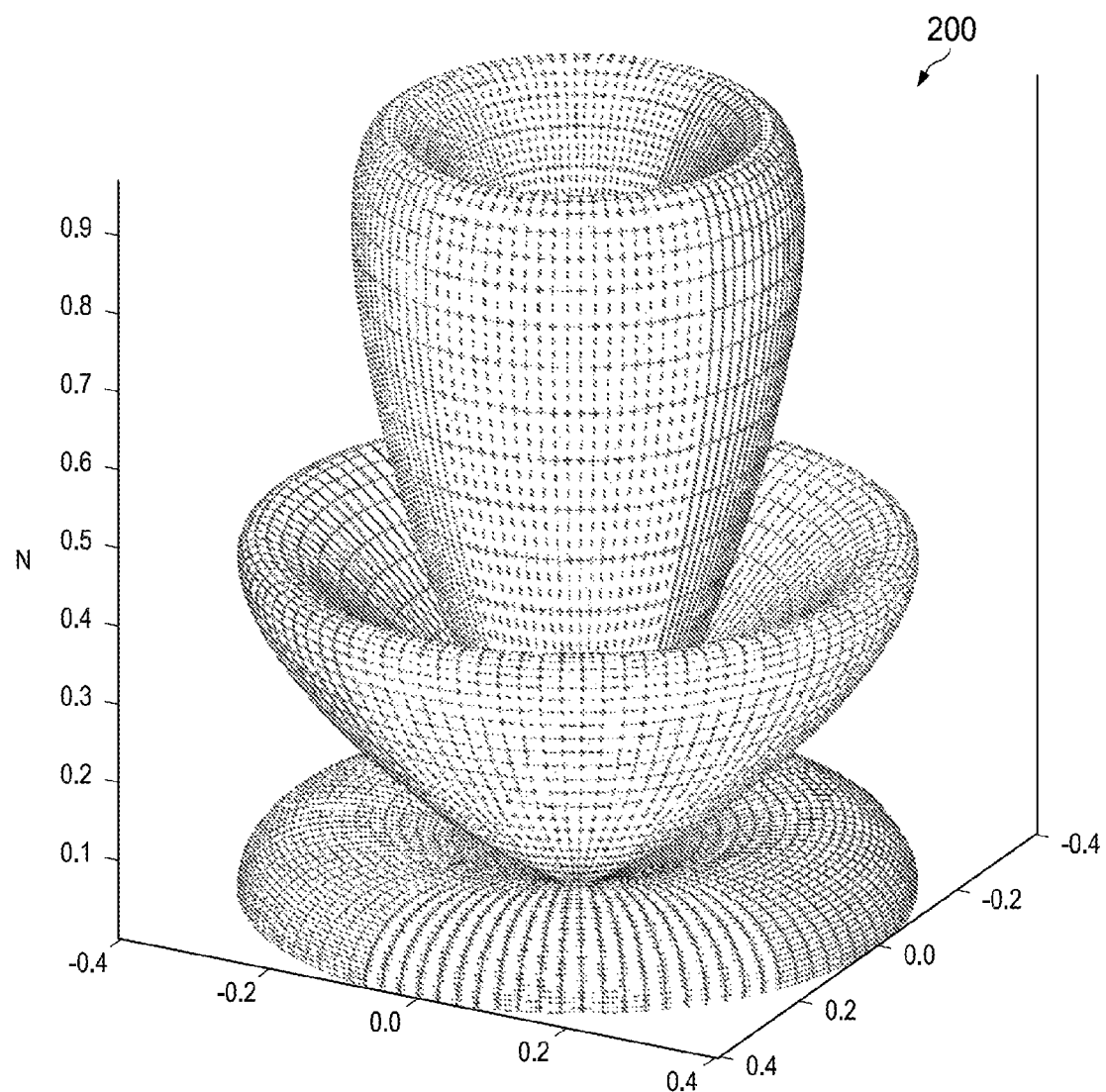
FIG. 2 illustrates a graph illustrating an example far-field pattern of $-1$-st order phase-mode $P_{-1}$ of a 16-element, $\lambda/2$ spaced circular ring array according to example embodiments described herein.
Figure 3:
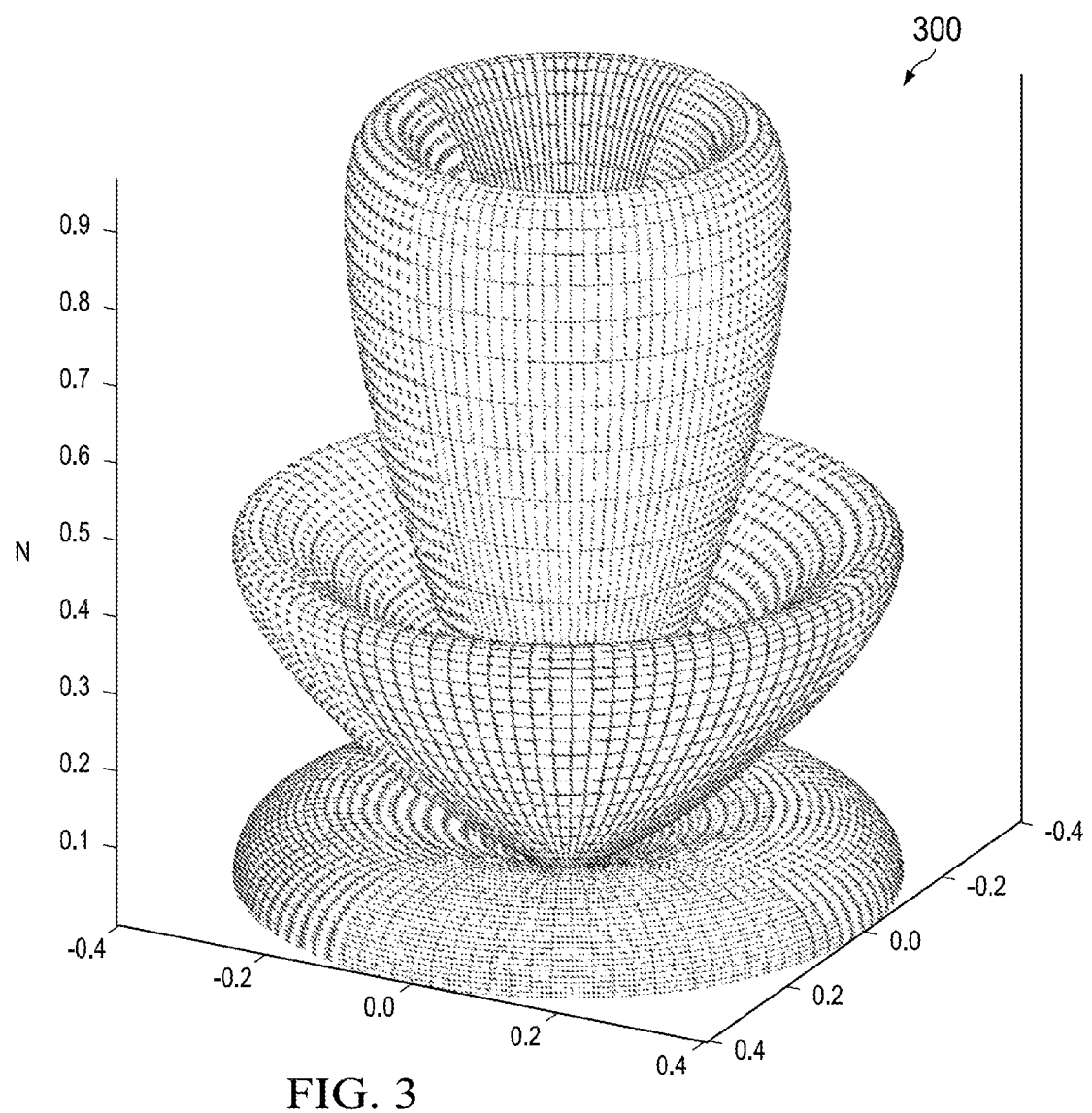
FIG. 3 illustrates a graph of an example far-field pattern of 1-st order phase-mode $P_1$ of a 16 element, $\lambda/2$ spaced circular ring array according to example embodiments described herein.

To help with the understanding of the operation of the invention, the far-field radiation patterns of the pertinent phase-modes are illustrated in FIGS. 1-3. FIG. 1 is a graph 100 illustrating an example far-field pattern of 0-th order phase-mode $P_0$ of a 16 element, $\lambda/2$ spaced circular ring array. FIG. 2 is a graph 200 illustrating an example far-field pattern of −1-st order phase-mode $P_{-1}$ of a 16-element, $\lambda/2$ spaced circular ring array. FIG. 3 is a graph 300 of an example far-field pattern of 1-st order phase-mode $P_1$ of a 16 element, $\lambda/2$ spaced circular ring array.

In an embodiment, all antenna elements are assumed to be substantially omnidirectional in the hemisphere bounded by the plane of the array and linearly polarized, for simplicity. In the 0-th order phase-mode, $P_0$, there is no phase progression in the element excitations around the circular ring array (all elements are fed in phase), so there is no phase-progression in the circumferential direction around the array (z) axis. Thus all the fields add in-phase on the array axis and form the main beam in the far field. Its normalized plot is shown in FIG. 1 for a 16-element ring array with elements spaced half-wavelength apart around the circumference. Different shading indicates phase, with darker shading denoting $-\pi$, lighter shading denoting 0, and medium shading denoting $+\pi$ radians relative to the $P_0$ excitation. FIGS. 2 and 3 show similar plots for the other phase-modes of the same ring array.

The phase progressions in the $P_1$ and $P_{-1}$ modes' far-field patterns are one complete cycle of $2\pi$ radians but in opposite directions around the z-axis, which is the same as their element excitation phase progressions.

Now it will be apparent that if one adds some proportion of, for example, the $P_1$ phase-mode to the $P_0$ phase-mode, the result will be a main lobe pointing in the direction where the two modes have the same phase (e.g. lighter shade for the above plots). The main lobe will deviate from the array axis by an amount proportional to the proportion of the $P_1$ mode being added. One can also vary the phase, $\theta$, of $P_1$, which will change the location on the circle where it is in phase with the original main beam $P_0$ thus causing the resultant main lobe to point in that direction.

Figure 4:
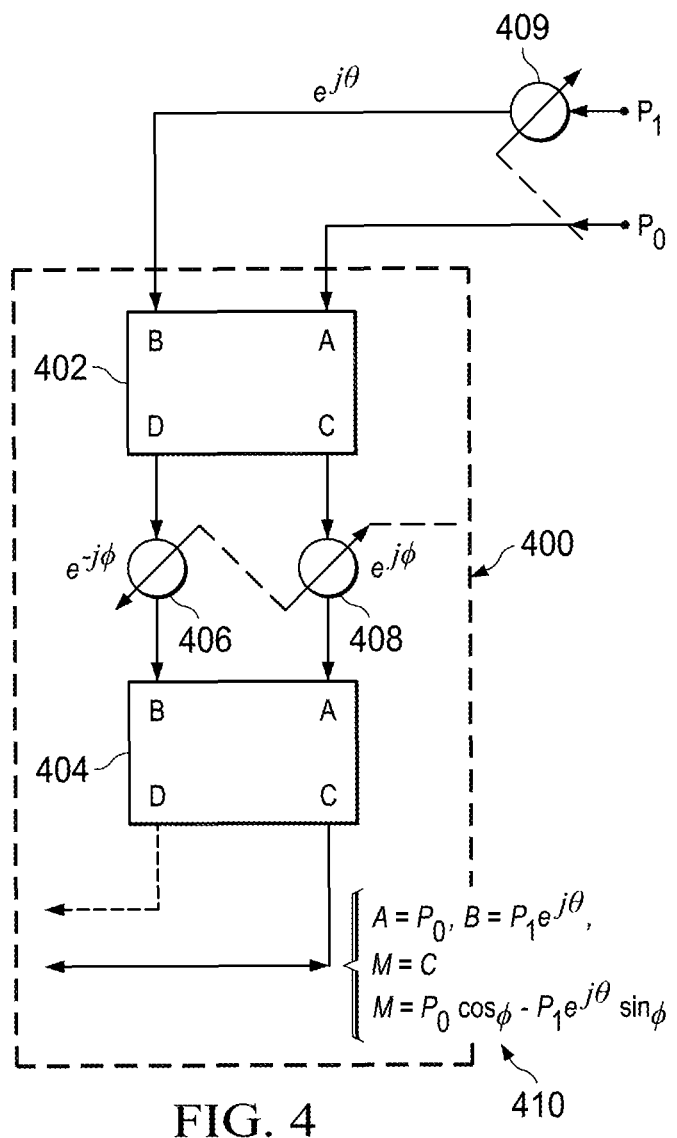
FIG. 4 illustrates a portion of an example beam-steerer system with a variable-ratio combiner controlled by setting phaseshift $\phi$, with phaseshift $\theta$ applied to input B according to example embodiments described herein.

FIG. 4 illustrates a portion of an example beam-steerer system 400 with a variable-ratio combiner controlled by setting phaseshift $\phi$, with phaseshift $\theta$ applied to input B. The portion of system 400 shown in FIG. 4 is a variable-ratio combiner. The system 400 includes two hybrid splitters/combiners 402, and 404 and two oppositely adjusted phase-shifters 406, and 408. Each hybrid splitter/combiner 402, and 404 has two inputs, A and B, and two outputs, D and C. The input A for the hybrid splitter/combiner 402 is the $P_0$ phase-mode from the far-field of an array of antennas (not shown). The input B for the hybrid splitter/combiner 402 is the $P_1$ phase-mode from the far-field of an array of antennas, and is phase shifted by phaseshifter 409. The output D of hybrid splitter/combiner 402 is the input for phase shifter 406 and the output C of hybrid splitter/combiner 402 is the input for phase shifter 408. The output from phase shifter 406 is the input B for the hybrid splitter/combiner 404 and the output from phase shifter 408 is the input A for the hybrid splitter/combiner 404. The output D from the hybrid splitter/combiner 404 is the auxiliary output. The output C from the hybrid splitter/combiner 404 is the main (M) output where the steered main beam is effected.

In an embodiment, while the relative phaseshift of the two phase-modes is simple to control using a variable phaseshifter 409, their relative proportions of addition are achieved using the variable-ratio combiner of system 400. In this embodiment, the two hybrid splitters/combiners 402, and 404 and two oppositely-adjusted phaseshifters 406, and 408 are used to realize the function described by the equation 410. The main output, M, is described by the function $$M = P_0 \cos\phi - P_1 e^{j\theta} \sin\phi,$$

where φ is the angle of the steered beam around the array axis in the radial direction and θ is the angle of the steered beam in the circumferential direction.

Figure 5:
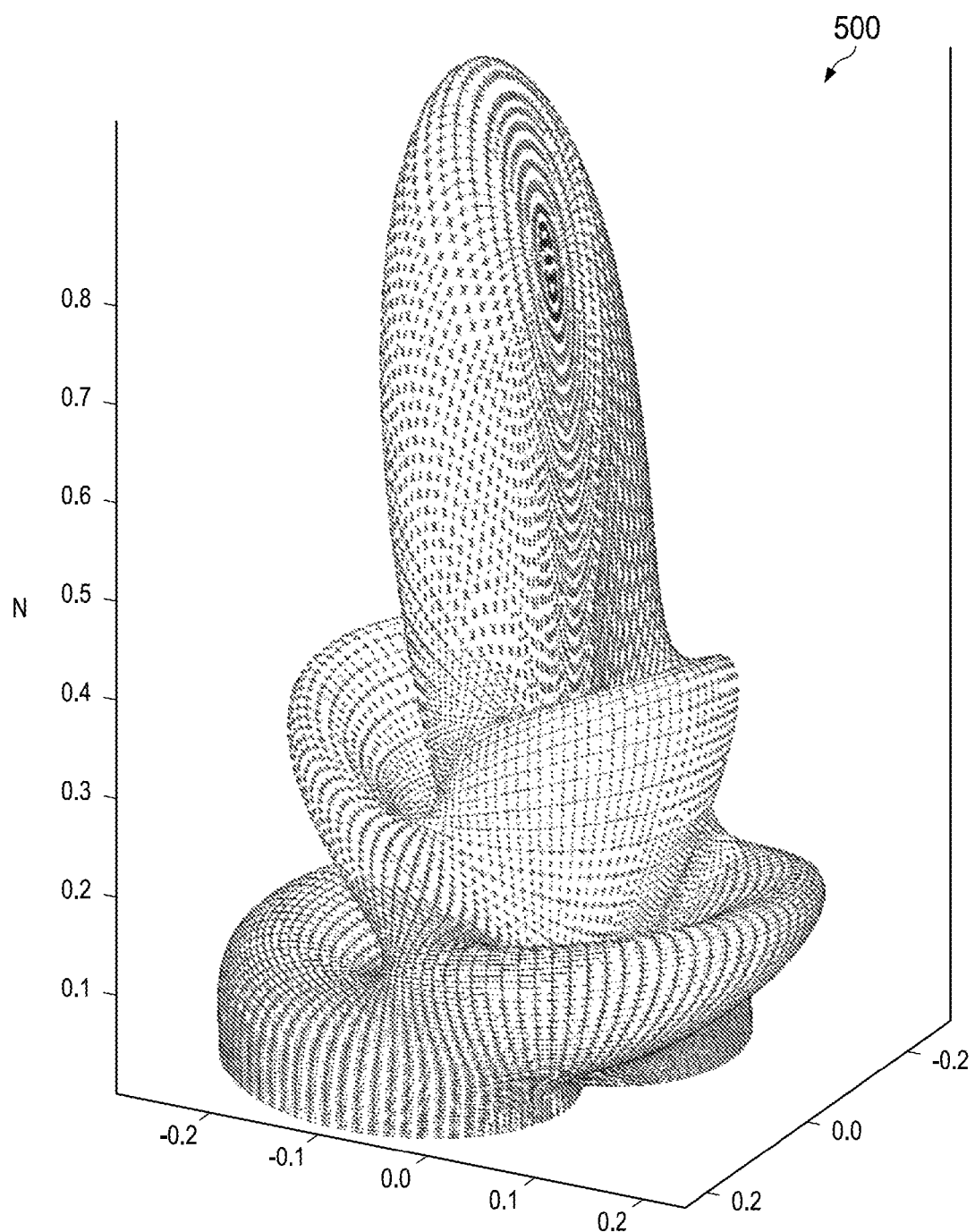
FIG. 5 illustrates a graph of an example resultant steered-beam far-field radiation pattern according to example embodiments described herein.
Figure 14:
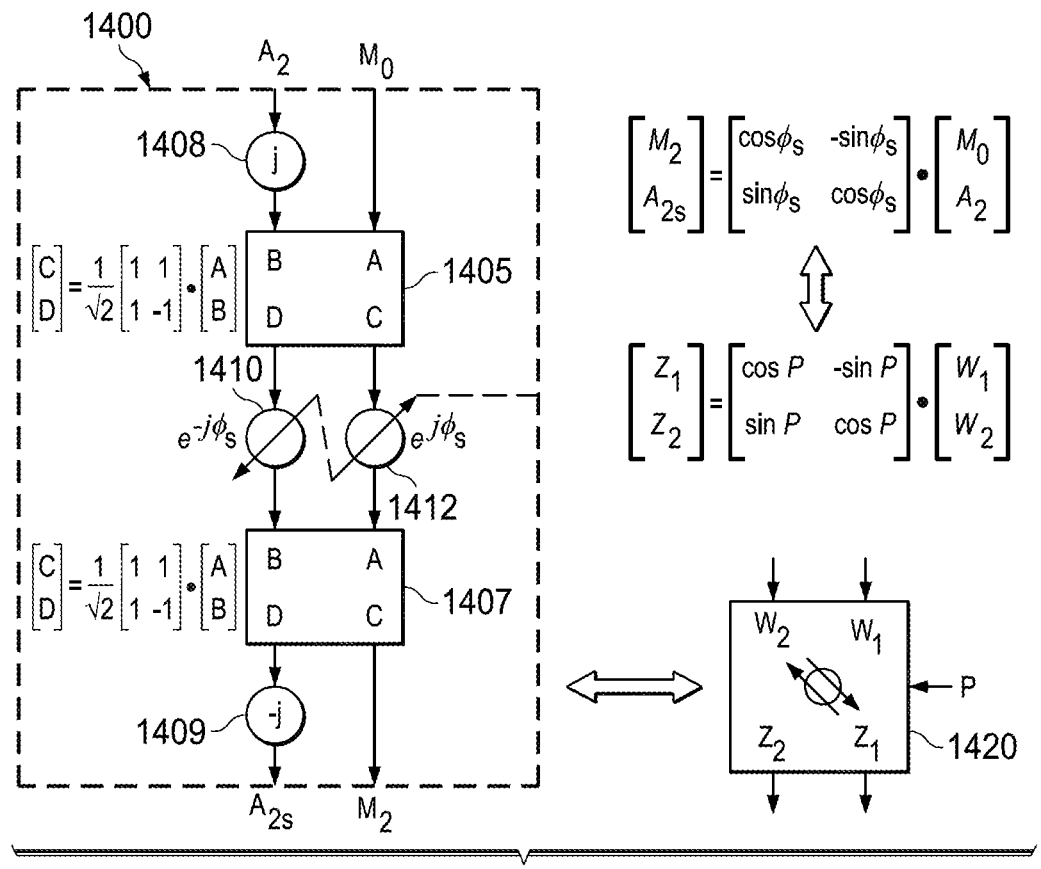
FIG. 14 illustrates an example variable-ratio combiner (VRC) according to example embodiments described herein.

The mathematics of the equation 410 requires input B to hybrid splitter/combiner 402 to be shifted by a fixed 90 degrees and the (auxiliary) output D of hybrid splitter/combiner 404 also has a fixed 90 degree phaseshift, both of which are of no practical consequence as it depends on the choice of hybrid splitter/combiner in the implementation. As an example, FIG. 14 illustrates a convenient grouping which is common in a number of instances within example embodiments presented herein. An example of the resultant steered-beam far-field radiation pattern 500 at the main (M) output C from hybrid splitter/combiner 404 is shown in FIG. 5 with θ=2π*0.5 and φ=2π*0.125 radians.

It is possible to obtain a greater steering angle and lower sidelobes in the steered beam by also making use of the other first-order phase-mode, $P_{-1}$, by virtue of a simple trigonometric identities as follows.

Suppose the intrinsic phase of phase-mode $P_1$ at some angle on the circumference of its main cone is a and its amplitude is ρ. Then $P_{-1}$ will have the same amplitude but its phase will be −α. Applying phaseshifts θ and −θ to these, respectively, results in:

$$P_1 e^{j\theta} = \rho e^{j(\alpha+\theta)} = \rho \cos(\alpha+\theta) + j\rho \sin(\alpha+\theta)$$

and $$P_{-1} e^{-j\theta} = \rho e^{j(-\alpha-\theta)} = \rho \cos(-\alpha-\theta) + j\rho \sin(-\alpha-\theta) = \rho \cos(\alpha+\theta) - j\rho \sin(\alpha+\theta).$$

Now, the combined, oppositely-phased first order phase-modes produce:

$$P_1 e^{j\theta} - P_{-1} e^{-j\theta} = j2\rho \sin(\alpha+\theta)$$

which for any given θ reaches a maximum value of j2 where α+θ=π/2, minimum of −j2 where α is such that α+θ=−π/2, and is 0 where α+θ=π or 0. Notice that, if we compensate $P_0$ by multiplying it by j, it will always be in phase with the above combined and phaseshifted phase-modes. By adding them all together in a variable-ratio combiner, it will result in a peak where the combined modes have a peak, a minimum where they have their minimum, and no effect where they are 0, effecting a steering of the original $P_0$ main lobe in the circumferential direction by roughly twice the amount as with only one 1-st order phase-mode, and no "fattening" of the main beam in the directions orthogonal to the direction of steering.

Figure 6:
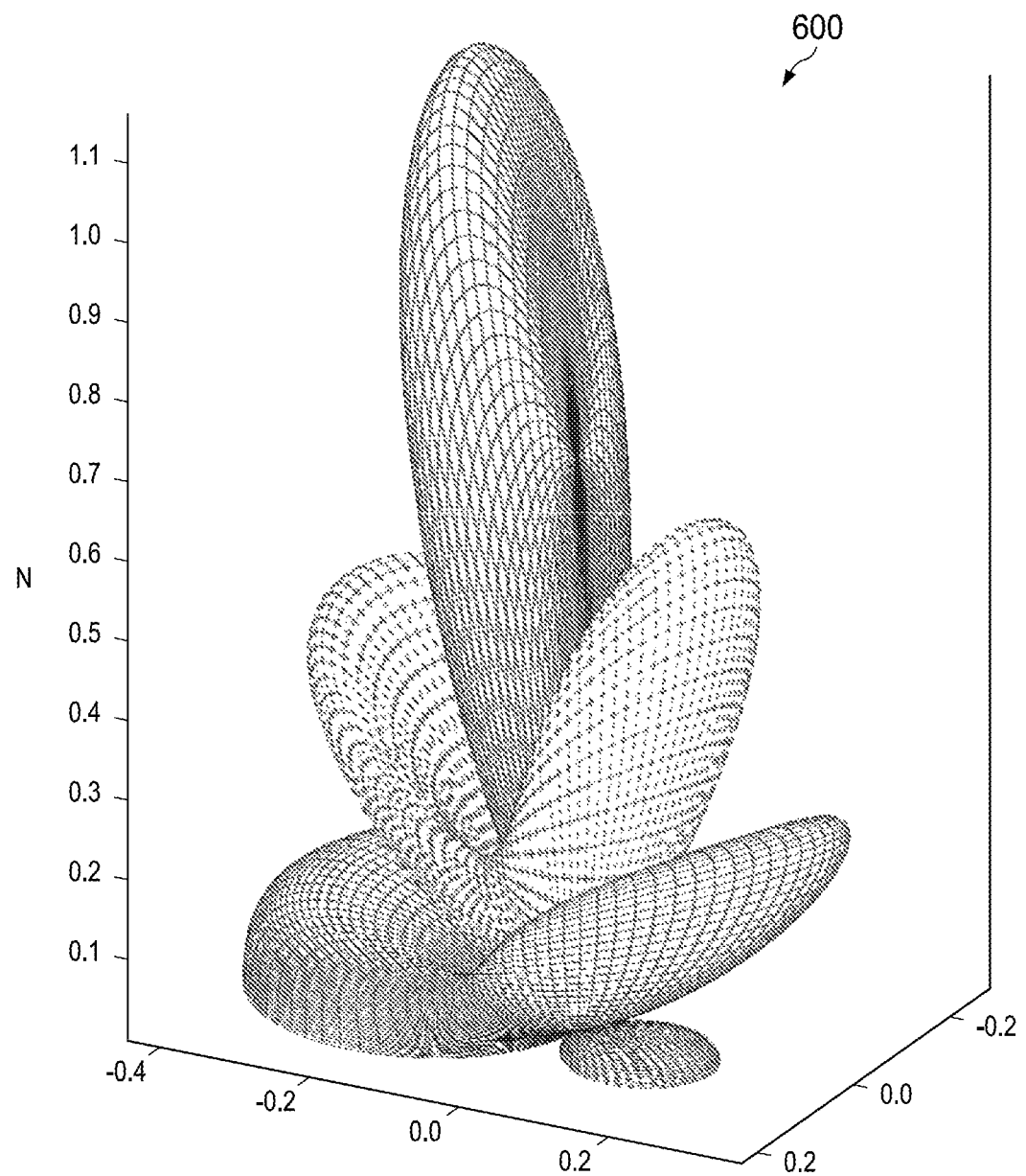
FIG. 6 illustrates a graph of an example resultant steered-beam far-field radiation pattern achieved by making use of both $-1^{st}$ and $+1^{st}$ phase-mode signals according to example embodiments described herein.

The effect can be seen in the FIG. 6 for the same steering parameters as in FIG. 5. Note the sharper shape of the steered beam and greater tilt in the radial direction corresponding to the control by φ. Its equation is given by:

$$M = P_0 \cos\phi - (P_1 e^{j\theta} - P_{-1} e^{-j\theta}) \sin\phi.$$

It is noted that in FIG. 6 that there is no phase variation over the steered main beam, as in the original main beam due to $P_0$. This means that the modem will not need to track carrier-phase variations as the beam is steered, unlike in the case shown in FIG. 5.

Figure 7:
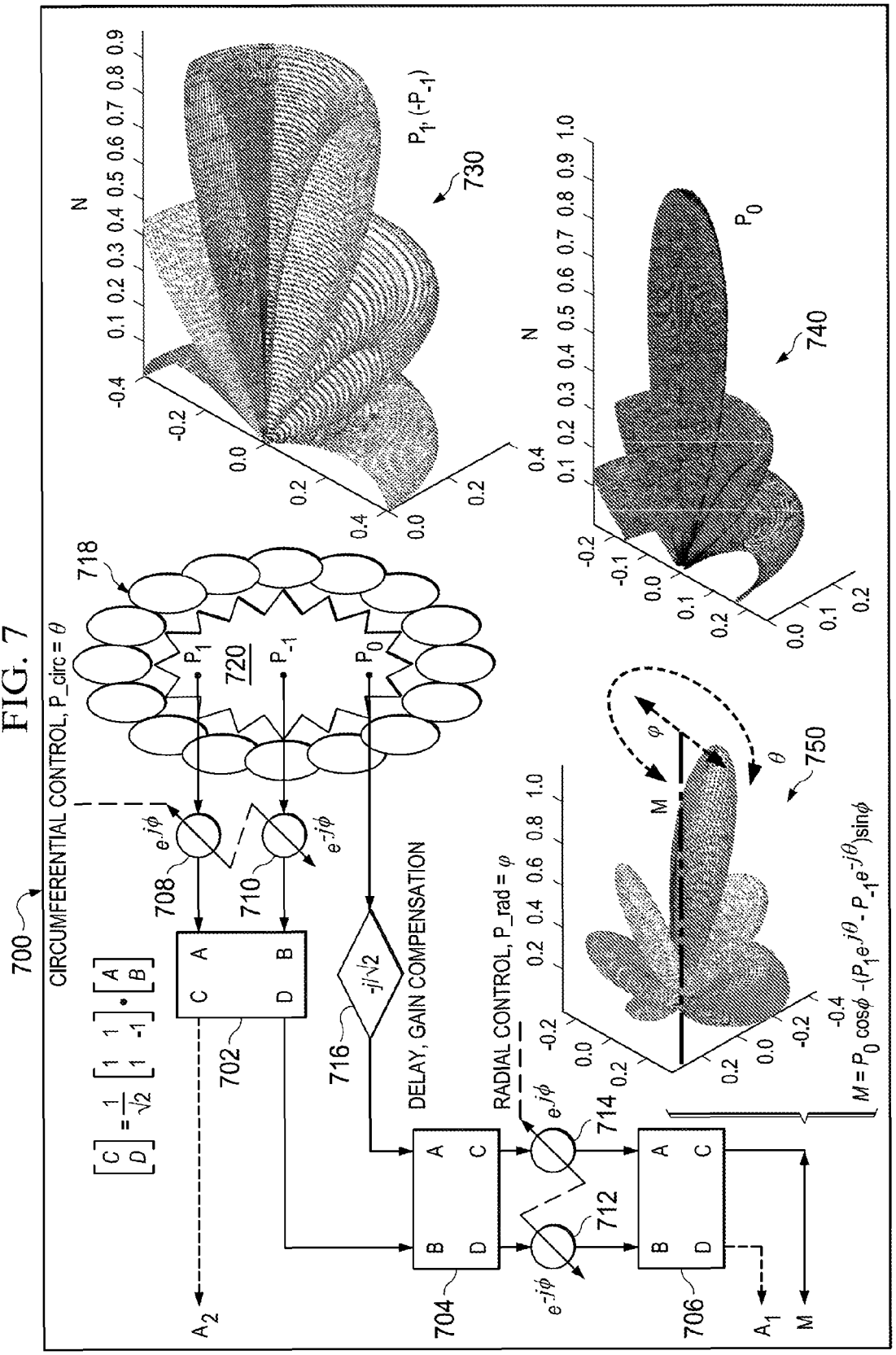
FIG. 7 illustrates an example beam-steering system according to example embodiments described herein.

FIG. 7 illustrates an example beam-steering system 700. Beam-steering system 700 makes use of $P_0$, $P_1$, and $P_{-1}$. Beam-steering system 700 includes a circular array of antenna elements 718, a phase-mode feed network 720, four phase shifters 708, 710, 712, 714, three hybrid splitters/combiners 702, 704, 706, and a delay and gain compensation module 716. Graph 730 is a cross-section plot of the $P_1$ and $P_{-1}$ components of the phase-mode pattern of the far-field beam received by the array 718. Graph 740 is a cross-section plot of the $P_0$ component of the phase-mode pattern of the far-field beam received by the array 718. Graph 750 is a plot of the steered far-field pattern of the resultant main output C from hybrid splitter/combiner 706, i.e. the output M of the beam-steerer 700.

A detailed description of beam-steering system 700 and variations thereof is provided in co-assigned U.S. patent application Ser. No. 13/870,309, filed Apr. 25, 2013, entitled "Simple 2D Phase-Mode Enabled Beam-Steering Means," which is incorporated herein by reference.

According to an example embodiment, it may be possible to control the variable phase shifters of beam-steering system 700 to allow beam-steering system 700 to automatically track a signal of interest. A relatively small amount of additional circuitry, including a duplicate variable-ratio combiner, which is independent of the number of elements in the antenna array may be added. Additionally, an auxiliary beam output is provided which may serve as an input to a spatial interference-cancelling subsystem.

Figure 8:
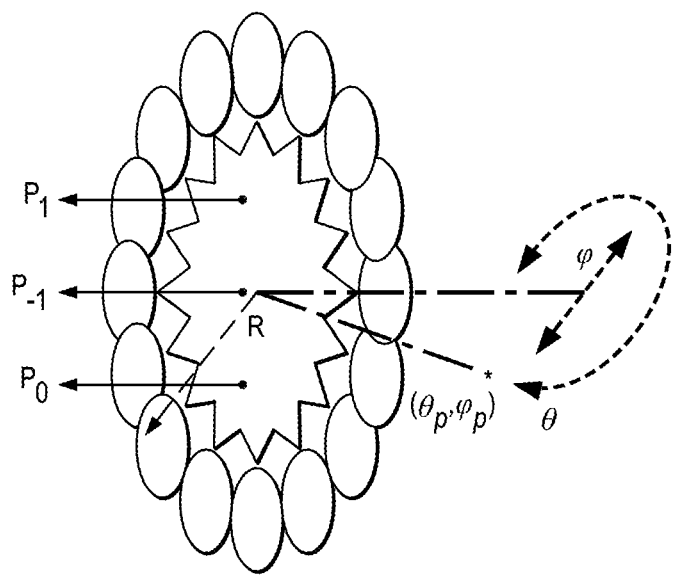
FIG. 8 illustrates a diagram of example coordinates and phase-modes of a circular ring array and its far field according to example embodiments described herein.

The output signals of beam-steering system 700 may be expressed as:

$$M = (-j/\sqrt{2})[P_0 \cos\varphi_s - (P_1 e^{j\theta_s} - P_{-1} e^{-j\theta_s})\sin\varphi_s] \quad (1)$$

$$A_1 = \left(-\frac{j}{\sqrt{2}}\right)[P_0 \sin\varphi_s + (P_1 e^{j\theta_s} - P_{-1} e^{-j\theta_s})\cos\varphi_s] \quad (2)$$

and $$A_2 = (P_1 e^{j\theta_s} + P_{-1} e^{-j\theta_s})/\sqrt{2}, \quad (3)$$

where ($\phi_s$, $\theta_s$) are the steering angle settings, $P_0$, $P_1$ and $P_{-1}$ are the phase-mode output signals which are functions of the angular position of the source, ($\phi_p$, $\theta_p$) and contain the time-dependent factor m(t)$e^{j\omega t}$, m(t) being the modulation and ω the angular carrier frequency of the received RF signal from the source at point P in the far field of the circular ring array. FIG. 8 illustrates a diagram of example coordinates and phase-modes of a circular ring array and its far field.

Figure 9:
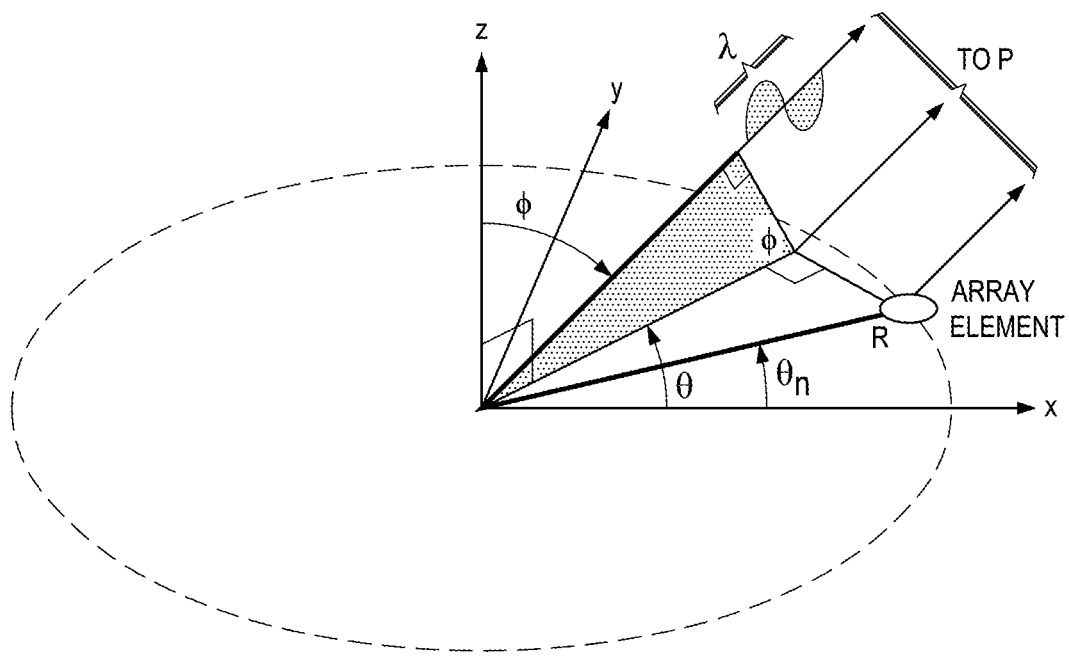
FIG. 9 illustrates an example geometry for a circular ring array according to example embodiments described herein.

The phase-mode outputs as functions of the far-field angular coordinates (i.e., the radiation patterns) can be characterized in terms of Bessel functions of the first kind as $$P_0 = m(t) e^{j\omega t} J_0\left(\frac{2\pi R \sin\varphi_p}{\lambda}\right) \quad (4)$$

$$P_1 = -je^{j\theta_p} m(t) e^{j\omega t} J_1\left(\frac{2\pi R \sin\varphi_p}{\lambda}\right) \quad (5)$$

and $$P_{-1} = (-j)^{-1} e^{-j\theta_p} m(t) e^{j\omega t} J_{-1}\left(\frac{2\pi R \sin\varphi_p}{\lambda}\right) = \quad (6)$$
$$-je^{-j\theta_p} m(t) e^{j\omega t} J_1\left(\frac{2\pi R \sin\varphi_p}{\lambda}\right),$$

where R is the radius of the circular ring array and the source is in direction $(\phi_p, \theta_p)$ with respect to the axis perpendicular to the plane of the circular ring array (array axis) and use was made of the Bessel function property that $J_{-n}(x)=(-1)^n J_n(x)$. The derivation of Equations (4)-(6) may be better understood in a more general context shown in FIG. 9, which illustrates an example geometry for the circular ring array.

The physical length with respect to the center of the circle is measured along the line of propagation containing the wavelength, $\lambda$. It determines electrically the phaseshift at the n-th antenna element of the circular ring array, and has the same proportion to the wavelength, $\lambda$, as the electrical phaseshift, $\psi$, has to a full cycle of $2\pi$ radians. Therefore for the n-th element, $$\frac{\psi_n}{2\pi} = \frac{L - R\cos(\theta - \theta_n)\sin\varphi}{\lambda}, \quad (7)$$

where L is the length of the propagation path from the center of the circular ring array to point P in its far field. It is noted that its effect is common to all elements of the circular ring array and will be ignored. Assuming each element has an omnidirectional pattern within the field of view and an electronic phaseshift of $\beta_n$, the sum of the fields from all elements at P is proportional to $$F_p = K\Sigma_{n=1}^N e^{j\beta_n} e^{j\psi_n}, \quad (8)$$

where K absorbs the common propagation constants. The total field is a function of the angular coordinates and forms an antenna radiation pattern when plotted in those coordinates. Expressed in greater detail, $$F_P(\theta, \varphi) = K \sum_{n=1}^{N} e^{j\beta_n} e^{-j\frac{2\pi R\sin\varphi}{\lambda}\cos(\theta-\theta_n)}. \quad (9)$$

In the k-th phase-mode excitation of the circular ring array, $\beta_n = k\theta_n$, so the far field is expressible as $$F_{P,k}(\theta, \varphi) = Ke^{jk\theta} \sum_{n=1}^{N} e^{-j\left(k(\theta-\theta_n)+\frac{2\pi R\sin\varphi}{\lambda}\cos(\theta-\theta_n)\right)}. \quad (10)$$

Now let $\alpha_n = \theta - \theta_n - \pi/2$ so that $\cos(\theta-\theta_n) = -\sin\alpha_n$ and $e^{jk(\theta-\theta_n)} = (j)^k e^{jk\alpha_n}$, Equation (10) may be rewritten as $$F_{P,k}(\theta, \varphi) = K(-j)^k e^{jk\theta} \sum_{n=1}^{N} e^{-j\left(k\alpha_n - \frac{2\pi R\sin\varphi}{\lambda}\sin(\alpha_n)\right)}. \quad (11)$$

It is noted that $\theta$ is the angular azimuth coordinate in the far field, as well as at the circular ring array (same applies to the elevation angular coordinate $\phi$), and that the electrical phase progression in azimuth is the same in the far field as at the circular ring array (element excitations). If the summation is weighted by the incremental angular progression $\Delta\alpha_n = \Delta\alpha$ then normalized by their sum, which is always $2\pi$ for any phase-mode, then it may be possible to express the far field as $$F_{P,k}(\theta, \varphi) = (-j)^k e^{jk\theta} \frac{K}{2\pi} \sum_{n=1}^{N} e^{-j\left(k\alpha_n - \frac{2\pi R\sin\varphi}{\lambda}\sin(\alpha_n)\right)} \Delta\alpha, \quad (12)$$

and when the number of elements, N, is sufficiently large, replace the discrete summation by an integral so that the far field is expressible as $$F_{P,k}(\theta, \varphi) \approx (-j)^k e^{jk\theta} \frac{K}{2\pi} \int_{-\pi}^{\pi} e^{-j\left(k\alpha - \frac{2\pi R\sin\varphi}{\lambda}\sin(\alpha)\right)} d\alpha, \quad (13)$$

which is recognized as a Bessel function of the first kind, order k. Therefore $$F_{P,k}(\theta, \varphi) \approx (-j)^k e^{jk\theta} K J_k\left(\frac{2\pi R\sin\varphi}{\lambda}\right), \quad (14)$$

where k ranges from 0 to N. Since it is possible to have negative phase progressions with $-N/2 < k < N/2$, it is possible to use the fact that $J_{-k}(x) = (-1)^k J_k(x)$. Specifically, applying this fact to Equation (14), it is possible to use the following approximations for the three phase-modes of interest:

$$F_{P,0} \approx K J_0\left(\frac{2\pi R\sin\varphi}{\lambda}\right),$$

$$F_{P,1} \approx -je^{j\theta} K J_1\left(\frac{2\pi R\sin\varphi}{\lambda}\right),$$

and $$F_{P,-1} \approx -\left(\frac{1}{-j}\right) e^{-j\theta} K J_1\left(\frac{2\pi R\sin\varphi}{\lambda}\right) = -je^{-j\theta} K J_1\left(\frac{2\pi R\sin\varphi}{\lambda}\right).$$

Figure 11:
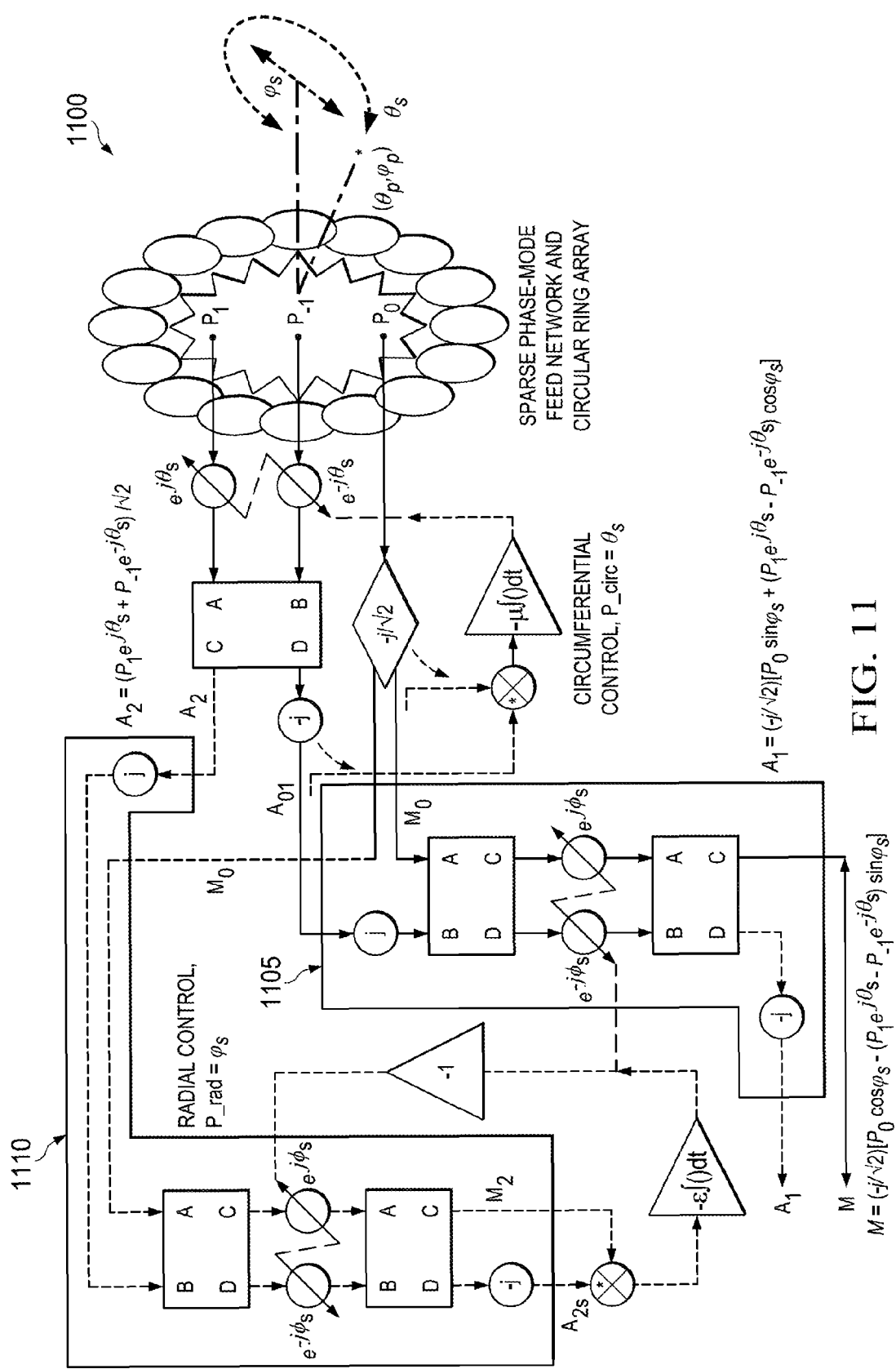
FIG. 11 illustrates a first example beam-steering system which includes beam-steering system shown in FIG. 7 with the additional analog control circuitry, where the "external" 90-degree phase-shifts are shown explicitly as factors $\pm j$ according to example embodiments described herein.
Figure 13:
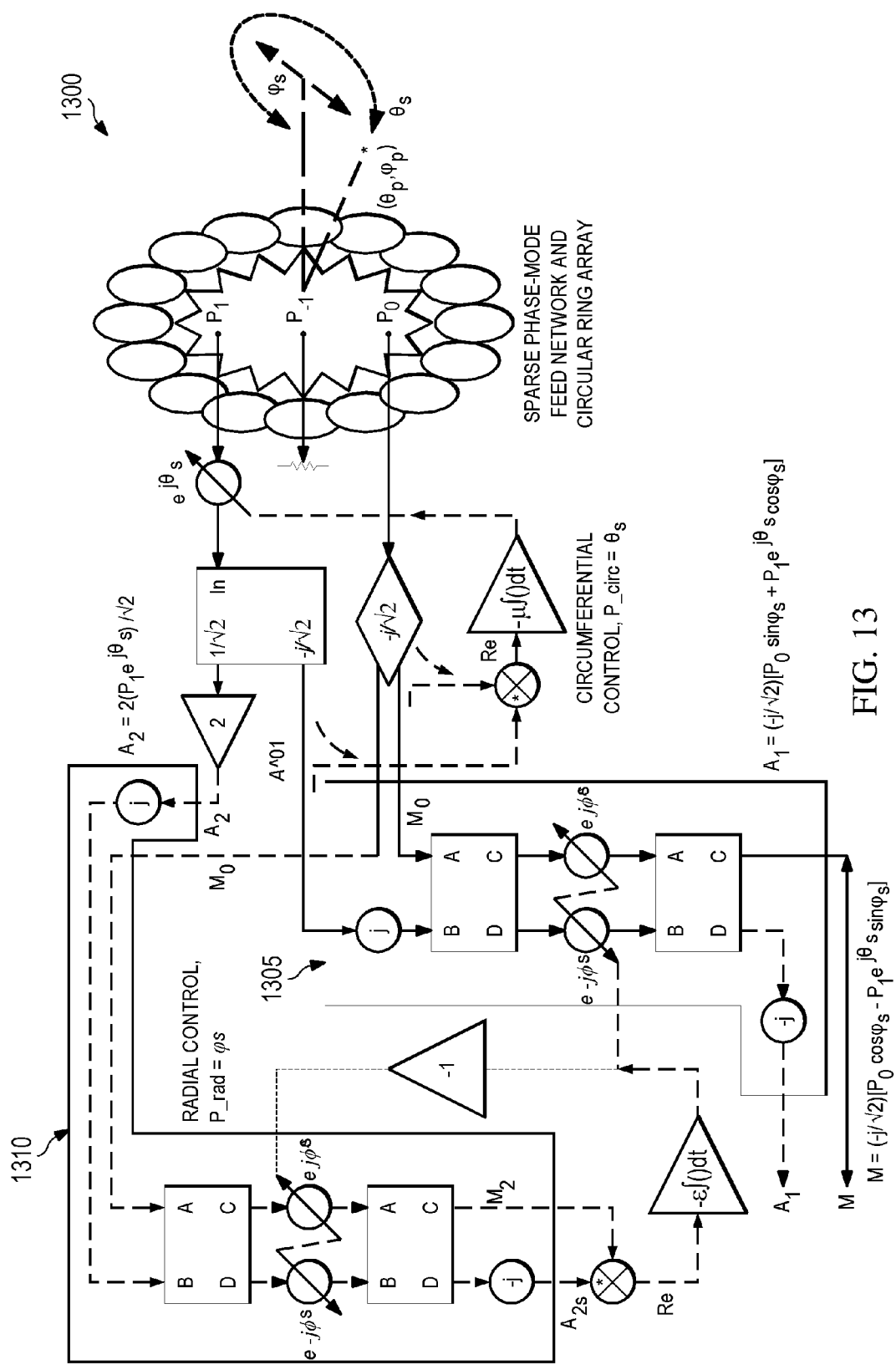
FIG. 13 illustrates a second example phase-mode enabled 2D beam-steering system according to example embodiments described herein.

With the phase-mode substitutions, the RF outputs of the variable-ratio combiner in FIGS. 11 and 13, with $M_0 = -jP_0/\sqrt{2} = +jKJ_0/\sqrt{2}$, $A_{01} = -j(P_1 e^{j\theta_s} - P_{-1} e^{-j\theta_s})/\sqrt{2} = -(K/\sqrt{2})(J_1 e^{j(\theta_s+\theta_p)} - J_1 e^{-j(\theta_s+\theta_p)})$, M and $A_1$ (with K containing the time-dependance $m(t)e^{j\omega t}$), become $$M = m(t)e^{j\omega t}\left[J_0\left(\frac{2\pi R\sin\varphi_p}{\lambda}\right)\cos\varphi_s - 2J_1\left(\frac{2\pi R\sin\varphi_p}{\lambda}\right)\sin(\theta_p + \theta_s)\sin\varphi_s\right] \quad (15)$$

and $$A_1 = \quad (16)$$
$$-m(t)e^{j\omega t}\left[J_0\left(\frac{2\pi R\sin\varphi_p}{\lambda}\right)\sin\varphi_s + 2J_1\left(\frac{2\pi R\sin\varphi_p}{\lambda}\right)\sin(\theta_p + \theta_s)\cos\varphi_s\right],$$

with the 90-degree phaseshifts corresponding to "j" being assumed to have been added externally in FIG. 7. Another output of a separate phase-mode combiner that will be useful is $$A_2 = -j\sqrt{2}\, m(t)e^{j\omega t} J_1\left(\frac{2\pi R\sin\varphi_p}{\lambda}\right)\cos(\theta_p + \theta_s). \quad (17)$$

Now, in order to formulate an adaptive algorithm which converges over time to the solution $\theta_s = -\theta_p$ and $\phi_s = -p\phi_p$ by minimizing a penalty function, a penalty function, $\Lambda$, is defined whose gradient is linear in $\theta_s$, $\phi_s$, according to a first-order linear differential equation such as $$\frac{dA}{dt} = -\mu \nabla_A \Pi, \tag{18}$$

where the entries of vector A are the adapted variables, namely the phase shifter settings $\theta_s$, $\phi_s$, and p is a constant relating the electrical phase of the variable-ratio combiner to the radial tilt angle of the beam, and the electrical phase $\theta_s$ is the same as the circumferential physical angle of the beam, and $\mu$ is the time-constant of adaptation. Beam-steering system 700 to be adaptively controlled is as depicted in FIG. 7.

Generally, it is not necessary to actually find $\Lambda$ explicitly; It may be possible to directly look for some function of the outputs M, $A_1$, $A_2$, which are linear in the phase-shift parameters, at least for the small angles over which the beam-steering system 700 operates. To that end, it helps to simplify the arguments of the Bessel functions. Starting with the common practice of half-wavelength element spacing, the circumference for N elements is $2\pi R = N\lambda/2$, so the Bessel functions' arguments become $2\pi R \sin \phi_p/\lambda = N \sin \phi_p/2$, which then approximates to $N \phi_p/2$. Furthermore, it is assumed that these arguments are sufficiently small to allow truncating the following relations to one term each, $$\cos x = J_0(x) - 2J_2(x) + 2J_4(x) - 2J_6(x) \tag{19}$$

$$\sin x = 2J_1(x) - 2J_3(x) + 2J_5(x) \tag{20}$$

Figure 10:
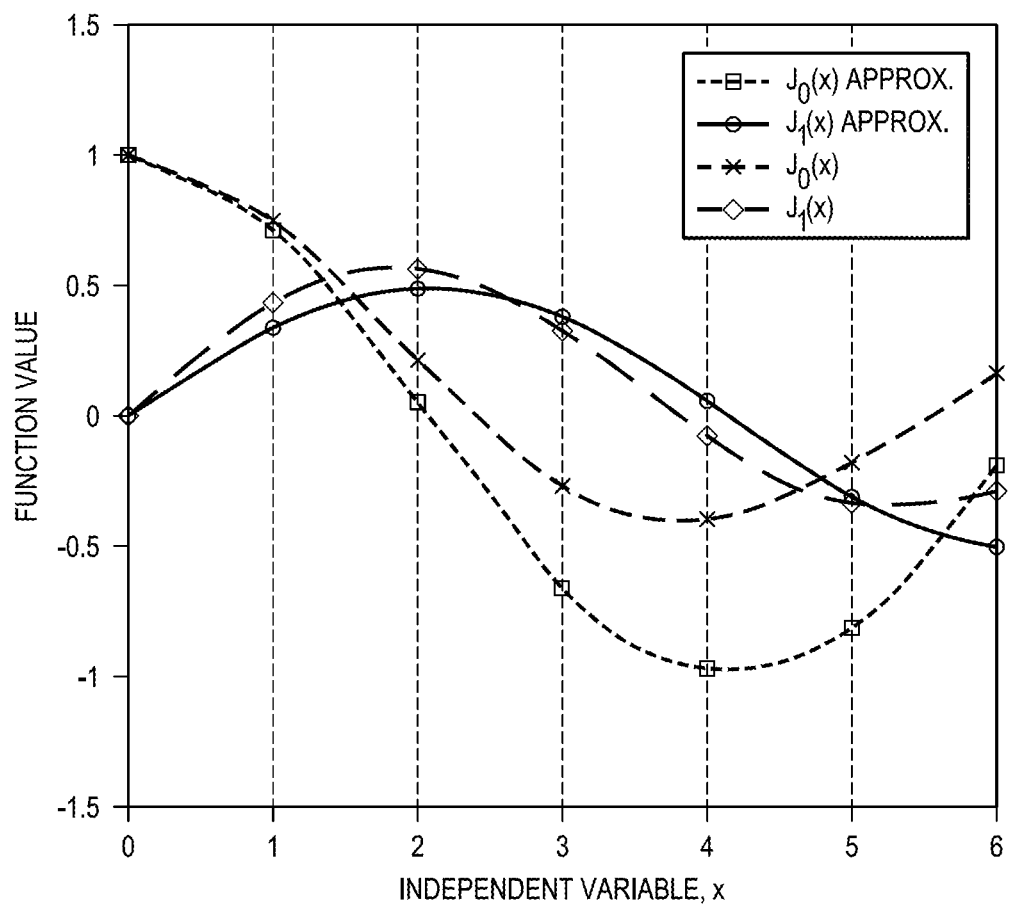
FIG. 10 illustrates plots of example Bessel functions $J_0$, $J_1$ and their approximations with $q=3/4$ according to example embodiments described herein.

It then happens that the resultant approximations can be improved by scaling the independent variable by q=3/4, because for the present purposes it is needed that $0 < \phi_p < \pi/8$, so their behavior needs to follow that of the original Bessel functions only for x=0 to about x=3. The approximations can work up to even x=6, as seen from the comparative graphs shown in FIG. 10, which illustrates plots of example Bessel functions $J_0$, $J_1$ and their approximations with q=3/4.

Substituting $$J_0(x) \cong \cos qx \tag{21}$$

$$J_1(x) \cong \frac{1}{2} \sin qx \tag{22}$$

and applying some common trigonometric identities, the output signals of beam-steering system 700 are expressible as $$M \cong m(t)e^{j\omega t}\left[\cos\left(\frac{qN\varphi_P}{2}\right)\cos\varphi_s - \sin\left(\frac{qN\varphi_P}{2}\right)\sin(\theta_p + \theta_s)\sin\varphi_s\right] \tag{23}$$

$$A_1 \cong -m(t)e^{j\omega t}\left[\cos\left(\frac{qN\varphi_P}{2}\right)\sin\varphi_s + \sin\left(\frac{qN\varphi_P}{2}\right)\sin(\theta_p + \theta_s)\cos\varphi_s\right] \tag{24}$$

and $$A_2 \cong \frac{-jm(t)e^{j\omega t}}{\sqrt{2}}\left[\sin\left(\frac{qN\varphi_P}{2}\right)\cos(\theta_p + \theta_s)\right]. \tag{25}$$

Next, form a time-averaged product of the first two signals, i.e. a zero-lag cross-correlation $MA_1^*$ expressible as $$\underline{MA_1^*} = -\frac{|m(t)|^2}{2}\left[\sin(2\varphi_s)\left(\cos^2\left(\frac{qN\varphi_P}{2}\right) - \sin^2\left(\frac{qN\varphi_P}{2}\right)\sin(\theta_p + \theta_s)\right) + \cos(2\varphi_s)\sin(qN\varphi_P)\right]\sin(\theta_p + \theta_s) \tag{26}$$

It is noted that this appears useful for adapting $\theta_s$ because the common factor $\sin(\theta_p + \theta_s)$ is linear for small angles $\theta_s$ and $\theta_p$. However, another such factor appears in one of the terms, so it would be nicer if $\phi_s = 0$. Fortunately, that is not necessary because that condition effectively exists at the inputs to the variable ratio combiner (including outside of the external 90-degree phase-shifters), which are denoted by $M_0$ and $A_{01}$, therefore $$\underline{M_0 A_{01}^*} = \frac{-|m(t)|^2}{2}\sin(qN\varphi_P)\sin(\theta_p + \theta_s). \tag{27}$$

When this is used in one component of the adaptive, gradient-descent algorithm, it is clear that it will converge (i.e., $$\frac{d\theta_s}{dt} = 0) \text{ to } \theta_p + \theta_s = 0$$

as long as $|\theta_p + \theta_s| < \pi/2$ and $\phi_p \neq 0$ (and $0 < qN\phi_p < \pi/2$). If $|\theta_p + \theta_s| > \pi/2$, the gradient-descent algorithm would diverge away from the unstable equilibrium point of $|\theta_p + \theta_s| = \pi$ until it reached the stable-convergence region where the feedback is negative. It is noted also that this adaptation is independent of $\phi_s$ and also is effectively converged if it happens that $\phi_p = 0$. Therefore the first part of the algorithm would be expressible as $$\frac{d\theta_s}{dt} = -\mu \nabla_{\theta_s} \Pi = \underline{\mu M_0 A_{01}^*} = -\mu \frac{|m(t)|^2}{2}\sin(qN\varphi_P)\sin(\theta_p + \theta_s). \tag{28}$$

To adapt $\phi_s$ something similar may be needed, involving $A_2$ so as to avoid the factor $\sin(\theta_p + \theta_s)$, and is hopefully independent of $(\theta_p + \theta_s)$. That turns out to be an additional variable-ratio combiner, for $A_2$ and $M_0$, whose phase-shifters are slaved to those of the original one in the main signal path of beam-steering system 700. FIG. 11 illustrates an example beam-steering system 1100 which includes beam-steering system 700 with the additional analog control circuitry, where the "external" 90-degree phase-shifts are shown explicitly as factors $\pm j$. A main variable-ratio combiner 1105 is shown in FIG. 11 and is similar to one of beam-steering system 700 with external 90-degree phase shifts shown explicitly as in FIG. 14.

An additional variable-ratio combiner 1110, along with its external 90-degree phase-shifts, produces the outputs labeled $M_2$, $A_{2s}$ from inputs $M_0$, $A_2$ available in beam-steering system 700, which are expressible as $$\begin{bmatrix} M_2 \\ A_{2s} \end{bmatrix} = \begin{bmatrix} \cos\varphi_s & -\sin\varphi_s \\ \sin\varphi_s & \cos\varphi_s \end{bmatrix}\begin{bmatrix} M_0 \\ A_2 \end{bmatrix}. \tag{29}$$

Substituting $$A_2 = -j\sqrt{2}\,m(t)e^{j\omega t}J_1\left(\frac{qN\sin\varphi_P}{2}\right)\cos(\theta_p + \theta_s) \cong$$

$$\frac{-jm(t)e^{j\omega t}}{\sqrt{2}}\left[\sin\left(\frac{qN\sin\varphi_P}{2}\right)\cos(\theta_p + \theta_s)\right]$$

$$\text{and } M_0 \cong \frac{-jm(t)e^{j\omega t}}{\sqrt{2}}\left[\cos\left(\frac{qN\sin\varphi_P}{2}\right)\right],$$

the two outputs, which will be correlated to form the gradient estimate are expressible as $$\begin{bmatrix} M_2 \\ A_{2s} \end{bmatrix} \cong \tag{30}$$

$$\frac{-jm(t)e^{j\omega t}}{\sqrt{2}} \begin{bmatrix} \cos\varphi_s \cos\left(\frac{qN\sin\varphi_p}{2}\right) - \sin\varphi_s \sin\left(\frac{qN\sin\varphi_p}{2}\right) \cos(\theta_p + \theta_s) \\ \sin\varphi_s \cos\left(\frac{qN\sin\varphi_p}{2}\right) + \cos\varphi_s \sin\left(\frac{qN\sin\varphi_p}{2}\right) \cos(\theta_p + \theta_s) \end{bmatrix}$$

Because these signals are formed after the azimuth steering stage which adjusts $\theta_s$, it is not independent of that stage. However, if the azimuth stage is nearly converged, as in the tracking mode so $|\theta_p + \theta_s| \ll 1$, then the above signals may simplify to $$\begin{bmatrix} M_2 \\ A_{2s} \end{bmatrix} \cong \frac{-jm(t)e^{j\omega t}}{\sqrt{2}} \begin{bmatrix} \cos\left(\varphi_s + \frac{qN\sin\varphi_p}{2}\right) \\ \sin\left(\varphi_s + \frac{qN\sin\varphi_p}{2}\right) \end{bmatrix}. \tag{31}$$

Now the zero-lag cross-correlation $M_2 A_{2s}^*$ may be expressible as $$\overline{M_2 A_{2s}^*} \cong \frac{-|m(t)|^2}{2} \sin\left(\varphi_s + \frac{qN\sin\varphi_p}{2}\right) \cos\left(\varphi_s + \frac{qN\sin\varphi_p}{2}\right) \tag{32}$$

or with $|\phi_p| \ll 1$, $$\overline{M_2 A_{2s}^*} \cong \frac{-|m(t)|^2}{4} \sin(2\varphi_s + qN\varphi_p). \tag{33}$$

Since it is assumed that the azimuth stage was nearly converged, the time-constant for this stage in the gradient-descent algorithm should be much smaller, i.e., $\epsilon \ll \mu$, for this to hold. Since the above correlation is also negative, the time-constant should have no negative sign in the algorithm, which for this elevation stage then becomes $$\frac{d\varphi_s}{dt} = \epsilon \nabla_{\varphi_s} \Pi = \epsilon \overline{M_2 A_{2s}^*} = -\epsilon \frac{|m(t)|^2}{4} \sin(2\varphi_s + qN\varphi_p). \tag{34}$$

Figure 12A:
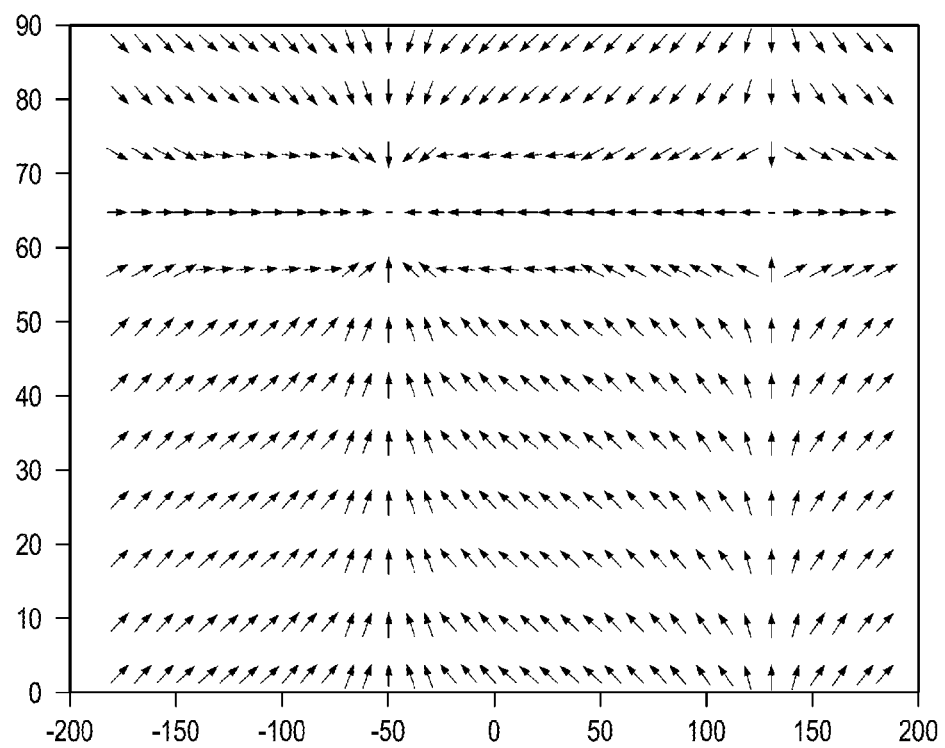
FIGS. 12a and 12b illustrate graphs of example convergence trajectories according to example embodiments described herein.
Figure 12B:
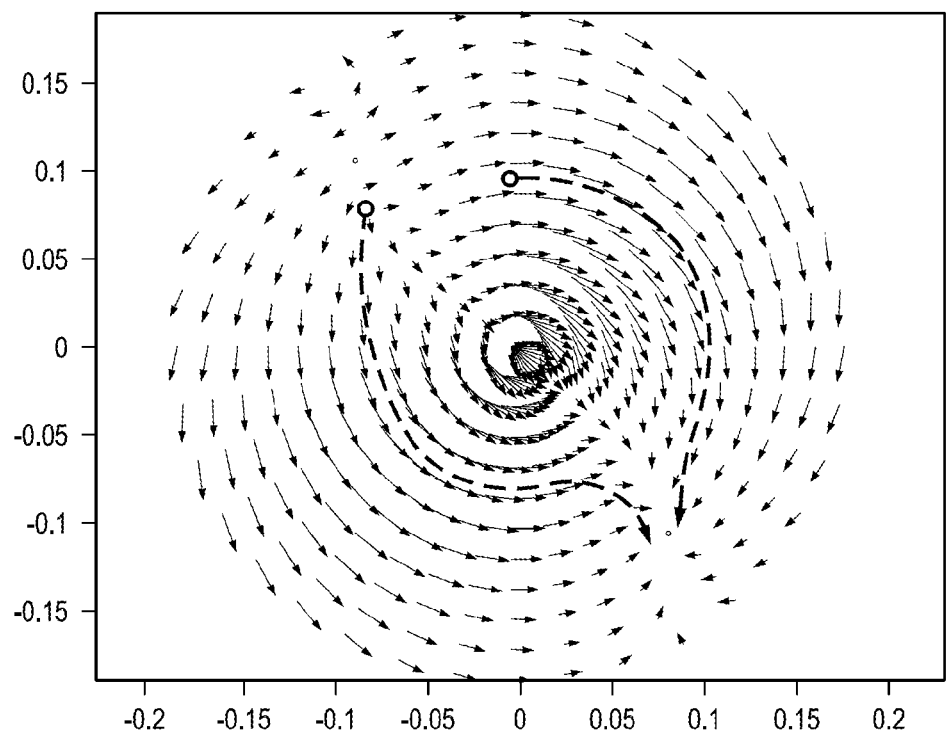

This will converge (i.e., $$\frac{d\varphi_s}{dt} = 0) \text{ to } qN\varphi_p + 2\varphi_s = 0$$

as long as $|qN\phi_p + 2\phi_s| < \pi/2$. It is noted that $\phi_s$ does not have to range over $2\pi$ radians as the azimuth has to do, because the steering works over only a relatively narrow range of elevation angles, so the convergence condition is more easily met. According to an example embodiment, all elevation angles are positive and less than $\pi/2$ radians. As discussed herein, they are $<\pi/8$ radians, and generally must be $\ll 1$ radian so the small-angle approximation can be used. If the same circular ring array is used for all phase-modes and the Bessel-function approximation is to be met up to $x=\pi$, then for N elements the elevation angle range would generally have to satisfy $qN\phi_p/2 < \pi$ or equivalently $$\varphi_p < \frac{2\pi}{qN} \tag{35}$$

which decreases with the size of the circular ring array. Convergence trajectories of the algorithm from all starting conditions to a given target state are shown in FIGS. 12a and 12b with q=1. Since the electrical phase $\theta_s$ corresponds to the physical circumferential angle $\theta_p$, the polar form of the gradient plot is a scaled version of the physical progression of the pointing direction of the beam's peak, viewed on the array axis. The arrows represent possible starting points of the algorithm for a given desired beam pointing direction. It may be seen that the phases converge to one spot from any starting point (dark circles on the dotted example trajectories in FIG. 12b), by following the arrows until one reaches a point where they disappear (zero length and no adjacent arrows pointing away from it, at the terminating arrows of the dotted example trajectories in FIG. 12b).

FIG. 13 illustrates a second example phase-mode enabled 2D beam-steering system 1300. Only two phase-mode outputs are required in this case. They are given by equations (4) and (5) and form the two inputs to a main variable-ratio combiner 1305 as $M_0 = -jP_0/\sqrt{2}$, $A_{01} = -j(P_1 e^{j\theta_s})/\sqrt{2}$. The outputs of main variable-ratio combiner 1305 (which is shown in detail in FIG. 14) are obtained similarly as equations (15) and (16), but more compactly, as $$\begin{bmatrix} M \\ A_1 \end{bmatrix} = \begin{bmatrix} \cos\varphi_s & -\sin\varphi_s \\ \sin\varphi_s & \cos\varphi_s \end{bmatrix} \begin{bmatrix} M_0 \\ A_{01} \end{bmatrix}. \tag{36}$$

After the substitutions for the vector in the right hand side of Equation (36) and matrix multiplication, the outputs are expressible as $$\begin{bmatrix} M \\ A_1 \end{bmatrix} = \frac{-jm(t)e^{j\omega t}}{\sqrt{2}} \tag{37}$$

$$\begin{bmatrix} \cos\varphi_s J_0\left(\frac{2\pi R \sin\varphi_p}{\lambda}\right) - \sin\varphi_s J_1\left(\frac{2\pi R \sin\varphi_p}{\lambda}\right)(-je^{j(\theta_p+\theta_s)}) \\ \sin\varphi_s J_0\left(\frac{2\pi R \sin\varphi_p}{\lambda}\right) + \cos\varphi_s J_1\left(\frac{2\pi R \sin\varphi_p}{\lambda}\right)(-je^{j(\theta_p+\theta_s)}) \end{bmatrix},$$

which corresponds to equations (15) and (16) for the second embodiment. With the same approximations of the Bessel functions and half-wavelength element spacing around the circular ring array circumference, the outputs corresponding to equations (23) and (24) are expressible as $$\begin{bmatrix} M \\ A_1 \end{bmatrix} \cong \frac{-jm(t)e^{j\omega t}}{\sqrt{2}} \tag{38}$$

$$\begin{bmatrix} \cos\varphi_s \cos\left(\frac{qN\sin\varphi_p}{2}\right) - \sin\varphi_s \sin\left(\frac{qN\sin\varphi_p}{2}\right)(-je^{j(\theta_p+\theta_s)})/2 \\ \sin\varphi_s \cos\left(\frac{qN\sin\varphi_p}{2}\right) + \cos\varphi_s \sin\left(\frac{qN\sin\varphi_p}{2}\right)(-je^{j(\theta_p+\theta_s)})/2 \end{bmatrix}.$$

Anticipating the same development as that leading to equations (26)-(28) for the second embodiment, it is possible to set $\phi_s=0$ to effectively obtain the phase-mode signals at the inputs to main variable-ratio combiner 1305, and to the added circuitry representing the part of the algorithm controlling $\theta_s$. Before these inputs are multiplied together, they are $$\begin{bmatrix} M \\ A_1 \end{bmatrix} \cong \frac{-jm(t)e^{j\omega t}}{\sqrt{2}} \begin{bmatrix} \cos\left(\frac{qN\sin\varphi_p}{2}\right) \\ \sin\left(\frac{qN\sin\varphi_p}{2}\right)(-je^{j(\theta_p+\theta_s)})/2 \end{bmatrix}. \quad (39)$$

In this example embodiment of beam steering system 1300, this part of the algorithm differs a bit from that in the second example embodiment in that only the real part of the product of the quantities in the right hand side of equation (39) above is used (there is only the real part present in the second embodiment so this becomes a redundant step in the second embodiment):

$$\text{Re}\{M_0 A_{01}^*\} \cong \frac{|m(t)|^2}{2}\sin(qN\sin\varphi_P)\sin(\theta_p+\theta_s). \quad (40)$$

Clearly, the circumferential steering algorithm is the same as in the first embodiment, except for having to explicitly take the real part in the left hand side of equation (40) in the first embodiment. In either embodiment, the input signal to the integrator with coefficient $\mu$ is real, so the common algorithm for both embodiments may be expressed as $$\frac{d\theta_s}{dt} = -\mu\nabla_{\theta_s}\Pi = -\mu\text{Re}\{M_0 A_{01}^*\} \cong -\mu\frac{|m(t)|^2}{2}\sin(qN\varphi_P)\sin(\theta_p+\theta_s). \quad (41)$$

Similar reasoning is applied to derive the corresponding part of the algorithm for adapting the radial steering phase $\phi_s$. In FIG. 13, the second auxiliary output is given by $A_2=2(P_1 e^{j\theta_s})/\sqrt{2}$, so additional variable-ratio combiner 1310 produces the outputs according to equation (29), which is expressible as $$\begin{bmatrix} M_2 \\ A_{2s} \end{bmatrix} = \quad (42)$$

$$\frac{-jm(t)e^{j\omega t}}{\sqrt{2}} \begin{bmatrix} \cos\varphi_s J_0\left(\frac{2\pi R\sin\varphi_p}{\lambda}\right) - 2\sin\varphi_s J_1\left(\frac{2\pi R\sin\varphi_p}{\lambda}\right)e^{j(\theta_p+\theta_s)} \\ \sin\varphi_s J_0\left(\frac{2\pi R\sin\varphi_p}{\lambda}\right) + 2\cos\varphi_s J_1\left(\frac{2\pi R\sin\varphi_p}{\lambda}\right)e^{j(\theta_p+\theta_s)} \end{bmatrix},$$

which may be approximated as to $$\begin{bmatrix} M_2 \\ A_{2s} \end{bmatrix} \cong \quad (43)$$

$$\frac{-jm(t)e^{j\omega t}}{\sqrt{2}} \begin{bmatrix} \cos\varphi_s\cos\left(\frac{qN\sin\varphi_p}{2}\right) - \sin\varphi_s\sin\left(\frac{qN\sin\varphi_p}{2}\right)e^{j(\theta_p+\theta_s)}/2 \\ \sin\varphi_s\cos\left(\frac{qN\sin\varphi_p}{2}\right) + \cos\varphi_s\sin\left(\frac{qN\sin\varphi_p}{2}\right)e^{j(\theta_p+\theta_s)}/2 \end{bmatrix}.$$

From here the same signal-processing operations are applied as in the corresponding part of the algorithm for second embodiment, since the condition $|\theta_p+\theta_s|<<1$ has the same effect, namely $e^{j(\theta_p+\theta_s)} \cong 1$, so $$\begin{bmatrix} M_2 \\ A_{2s} \end{bmatrix} \cong \frac{-jm(t)e^{j\omega t}}{\sqrt{2}} \begin{bmatrix} \cos\left(\varphi_s+\frac{qN\sin\varphi_p}{2}\right) \\ \sin\left(\varphi_s+\frac{qN\sin\varphi_p}{2}\right) \end{bmatrix}, \quad (44)$$

which is identical to equation (31) in the second embodiment. Therefore the algorithm for adaptation of the radial steering phase in both embodiments is the same, namely $$\frac{d\varphi_s}{dt} = \varepsilon\nabla_{\varphi_s}\Pi = \varepsilon M_2 A_{2s}^* \cong -\varepsilon\frac{|m(t)|^2}{4}\sin(2\varphi_s+qN\varphi_p), \quad (45)$$

with $|\phi_p|<<1$ and the same conditions as previously. (While it is possible that $|\theta_p+\theta_s|<<1$ is not satisfied in the initial intervals of adaptation, the correlation multiplier may output a non-zero imaginary part, as it is generally a complex multiplier, so that could be used to trim line-lengths in the implementation until the imaginary part in that case is zero. It is forced to zero by taking only the real part to drive the integrator in the algorithm implementation, as shown explicitly in FIG. 13).

In order to facilitate discussion of beam-steering systems 1100 and 1300, some simplifying groupings of circuits are made. FIG. 14 illustrates an example variable-ratio combiner (VRC) 1400. Variable-ratio combiner 1400 includes two hybrid splitters/combiners 1405, and 1407 and two oppositely adjusted variable phaseshifters 1410, and 1412 and a fixed 90-degree phaseshifter 1408, and a fixed −90-degree phaseshifter 1409. Each hybrid splitter/combiner 1405, and 1407 has two inputs, A and B, and two outputs, D and C. In an example embodiment of its use, the input A for the hybrid splitter/combiner 1405 is the $M_0$ signal and the input B for the hybrid splitter/combiner 1405 is the $A_2$ signal with its phase subsequently shifted 90 degrees by phaseshifter 1408. The output D of hybrid splitter/combiner 1405 is the input for phase shifter 1410 and the output C of hybrid splitter/combiner 1405 is the input for phase shifter 1412. The output from phase shifter 1410 is the input B for the hybrid splitter/combiner 1407 and the output from phase shifter 1412 is the input A for the hybrid splitter/combiner 1407. The output D from the hybrid splitter/combiner 1407 is phase shifted −90 degrees by phaseshifter 1409 and is the $A_{2s}$ signal. The output C from the hybrid splitter/combiner 1407 is the $M_2$ signal. It is noted that variable-ratio combiner 1400 is discussed with signaling for an additional variable-ratio combiner, such as additional variable-ratio combiners 1110 and 1310. Variable-ratio combiner 1400 may also be used as main variable-ratio combiners 1105 and 1305. Symbol 1420 is a symbolic representation of variable-ratio combiner 1400. Symbol 1420 has input signals $W_1$ and $W_2$ and outputs $Z_1$ and $Z_2$.

Figure 15:
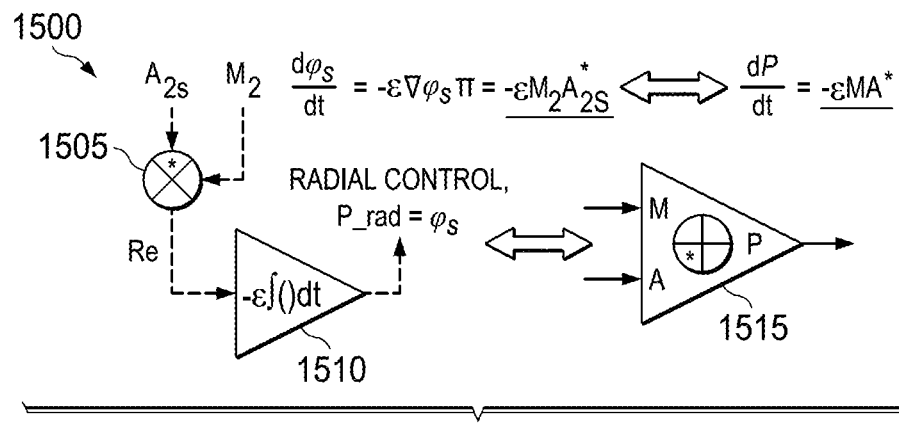
FIG. 15 illustrates an example zero-lag correlator (ZLC) according to example embodiments described herein.

FIG. 15 illustrates an example zero-lag correlator (ZLC) 1500. Zero-lag correlator 1500 includes a mixer 1505 and an integrator 1510. Mixer 1505 mixes a conjugate of input $A_{2s}$ with input $M_2$ and integrator 1510 integrates the output of mixer 1505 to produce a control signal for variable-ratio combiners. Symbol 1515 is a symbolic representation of zero-lag correlator 1500. Symbol 1515 has input signals M and A and output P and is used in several instances in the example embodiments, to produce the radial and circumferential control signals. It should be noted that this represents the mathematical functionality of ZLC 1500. Actual implementations of ZLC 1500 may include directional couplers, filters and amplifiers at the inputs, and assist circuitry around the multiplier and integrator, including analog to digital and digital to analog converters, discrete-time control and/or digital signals, as the algorithm can also be formulated in discrete-time.

Figure 16:
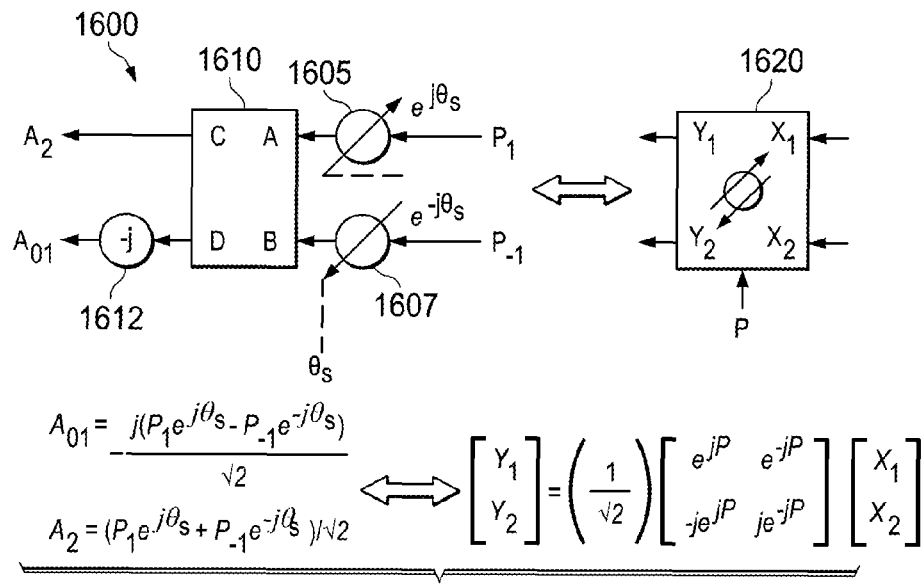
FIG. 16 illustrates an example variable-phase combiner (VPC) according to example embodiments described herein.

FIG. 16 illustrates an example variable-phase combiner (VPC) 1600. A first input for variable-phase combiner 1600 is the $P_1$ phase-mode from the circular ring array that is subsequently phaseshifted by variable phaseshifter 1605. A second input for variable-phase combiner 1600 is the $P_{-1}$ phase-mode from the circular ring array that is subsequently and oppositely phaseshifted by variable phaseshifter 1607. Output of phaseshifter 1605 is the A input of hybrid splitter/combiner 1610 and output of phaseshifter 1607 is the B input of hybrid splitter/combiner 1610. The C output of hybrid splitter/combiner 1610 is the $A_2$ signal and the D output of hybrid splitter/combiner 1610 is phaseshifted −90 degrees by fixed phaseshifter 1612 and is the $A_{01}$ signal. Symbol 1620 is the symbolic representation of variable-phase combiner 1600 and has inputs $X_1$ and $X_2$ and outputs $Y_1$ and $Y_2$.

Figure 17:
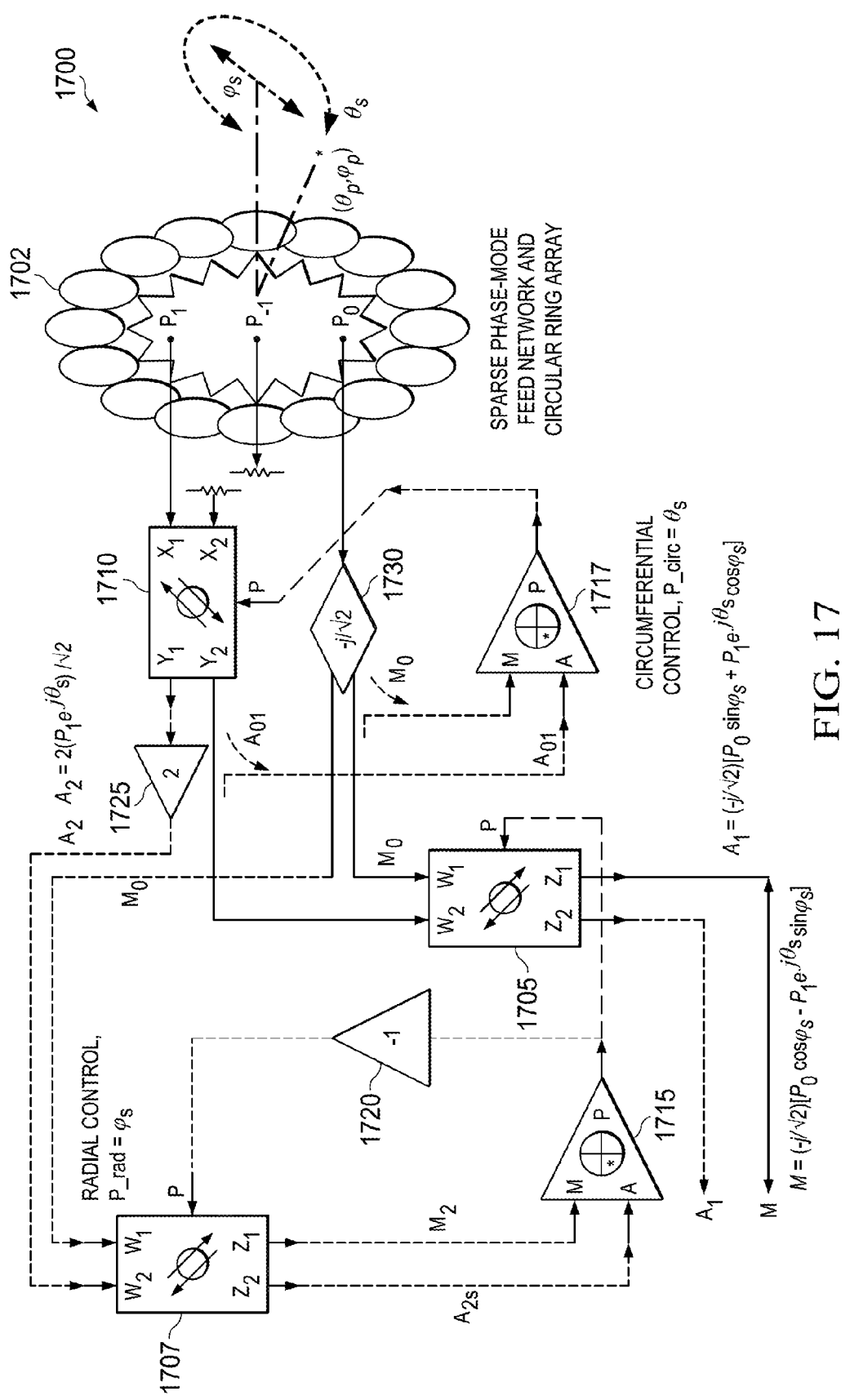
FIG. 17 illustrates a first example simplified beam-steering system according to example embodiments described herein.

FIG. 17 illustrates a first example simplified beam-steering system 1700. Beam-steering system 1700 is a simplified illustration of beam-steering system 1300 utilizing the circuit symbols discussed in FIGS. 14-16. Beam-steering system 1700 includes a main variable-ratio combiner 1705 and an additional variable-ratio combiner 1707. Beam-steering system 1700 also includes a variable-phase combiner 1710 coupled to circular ring array with sparse phase-mode feed network 1702. Zero-lag correlator 1715 generates control signals for main variable-ratio combiner 1705 and additional variable-ratio combiner 1707 (with a −1 scaling by scaler 1720 thereby inverting the control signal provided to additional variable-ratio combiner 1707). Zero-lag correlator 1717 generates a control signal for variable-phase combiner 1710. Zero-lag correlators 1715 and 1717 may hold fixed the control signals once they converge. Scaler 1725 scales the Y1 output of variable-phase combiner 1710 by 2. Splitter 1730 splits and scales the $P_0$ phase-mode from circular ring array 1702.

Phase-mode signal $P_1$ is input to variable-phase combiner 1710, producing signals $A_{01}$ and $A_2$. Scaler 1725 may multiply the output of variable-phase combiner 1710 by 2 to produce signal $A_2$. Phase-mode signal $P_0$ is shifted by −90 degrees and split into two $M_0$ signals by splitter 1730. One of the $M_0$ signals is provided to main variable-ratio combiner 1705 and zero-lag correlator 1717, while $A_{01}$ signal is provided to main variable-ratio combiner 1705 and zero-lag correlator 1715. Zero-lag correlator 1717 forms an output signal at P in accordance with Equations (28) and (41) whose time-derivative is proportional by μ to the circumferential steering angle $θ_s$ and is fed to the P input of variable-phase combiner 1710.

The other of the $M_0$ signals and signal $A_2$ are provided to additional variable-ratio combiner 1707. Additional variable-ratio combiner 1707 is to produce from its input signals, output signals $M_2$, and $A_{2s}$ and provide them to inputs of zero-lag correlator 1715. Zero-lag correlator 1715 produces a control signal for main variable-ratio combiner 1705 and an inverted version (multiplied by scaler 1720) is provided to additional variable-ratio combiner 1707. Its time-derivative is proportional by ε to the radial steering angle $φ_s$ of the beam, in accordance with Equations (34), and (45), where is ε preferably a much smaller scalar than μ, in order to assure the proper sequence of convergence of the steering signals.

Main variable-ratio combiner 1705 forms output signals M and $A_1$. The signal M represents the output of the steered beam which has its peak on the desired signal at P in the far field. Being bidirectional, beam steering system 1700 will also accept an input signal at M and transmit it to point P with the same beam.

Figure 18:
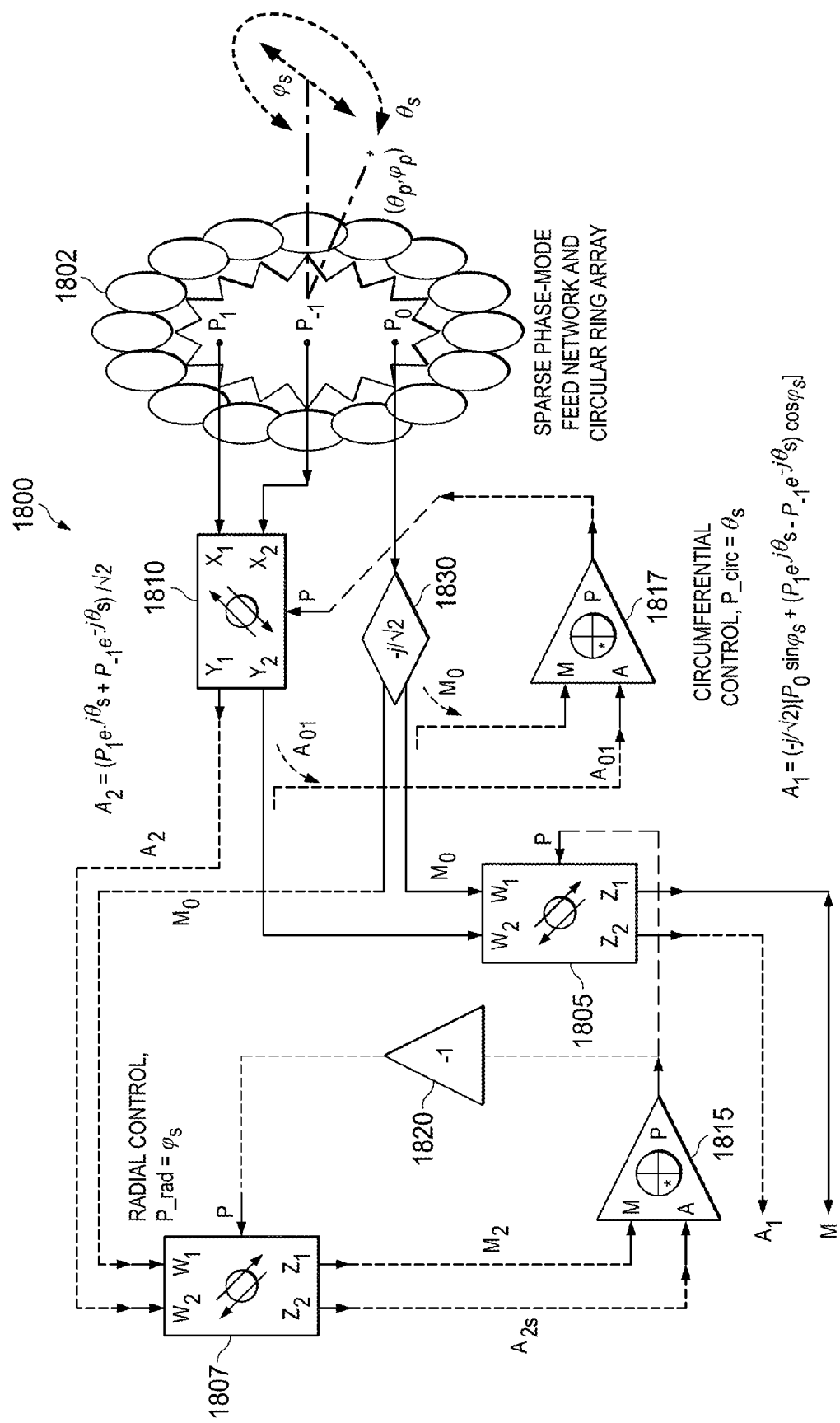
FIG. 18 illustrates a second example simplified beam-steering system according to example embodiments described herein.

FIG. 18 illustrates a second example simplified beam-steering system 1800. Beam-steering system 1800 is a simplified illustration of beam-steering system 1100 utilizing the circuit symbols discussed in FIGS. 14-16. Beam-steering system 1800 includes a main variable-ratio combiner 1805 and an additional variable-ratio combiner 1807. Beam-steering system 1800 also includes a variable-phase combiner 1810 coupled to circular ring array with sparse phase-mode feed network 1802. Zero-lag correlator 1815 generates control signals for main variable-ratio combiner 1805 and additional variable-ratio combiner 1807 (with a −1 scaling by scaler 1820 thereby inverting the control signal provided to additional variable-ratio combiner 1807). Zero-lag correlator 1817 generates a control signal for variable-phase combiner 1810. Zero-lag correlators 1815 and 1817 may hold fixed the control signals once they converge. Splitter 1830 splits and scales the $P_0$ phase-mode from circular ring array 1802.

Phase-mode signals $P_1$ and $P_{-1}$ are input to variable-phase combiner 1810, producing signals $A_{01}$ and $A_2$. Phase-mode signal $P_0$ is shifted by −90 degrees and split into two $M_0$ signals by splitter 1830. One of the $M_0$ signals is provided to main variable-ratio combiner 1805 and zero-lag correlator 1817, while $A_{01}$ signal is provided to main variable-ratio combiner 1805 and zero-lag correlator 1817. Zero-lag correlator 1817 forms an output signal at P in accordance with Equations (28) and (41) whose time-derivative is proportional by μ to the circumferential steering angle $θ_s$ and is fed to the P input of variable-phase combiner 1810.

The other of the M0 signals and signal $A_2$ are provided to additional variable-ratio combiner 1807. Additional variable-ratio combiner 1807 is to produce from its input signals, output signals $M_2$, and $A_{2s}$ and provide them to inputs of zero-lag correlator 1815. Zero-lag correlator 1815 produces a control signal for main variable-ratio combiner 1805 and an inverted version (multiplied by scaler 1820) is provided to additional variable-ratio combiner 1807. Its time-derivative is proportional by ε to the radial steering angle of the beam, in accordance with Equations (34), and (45), where is ε preferably a much smaller scalar than μ, in order to assure the proper sequence of convergence of the steering signals.

Main variable-ratio combiner 1805 forms output signals M and $A_1$. The signal M represents the output of the steered beam which has its peak on the desired signal at P in the far field. Being bidirectional, beam steering system 1800 will also accept an input signal at M and transmit it to point P with the same beam.

Figure 19:
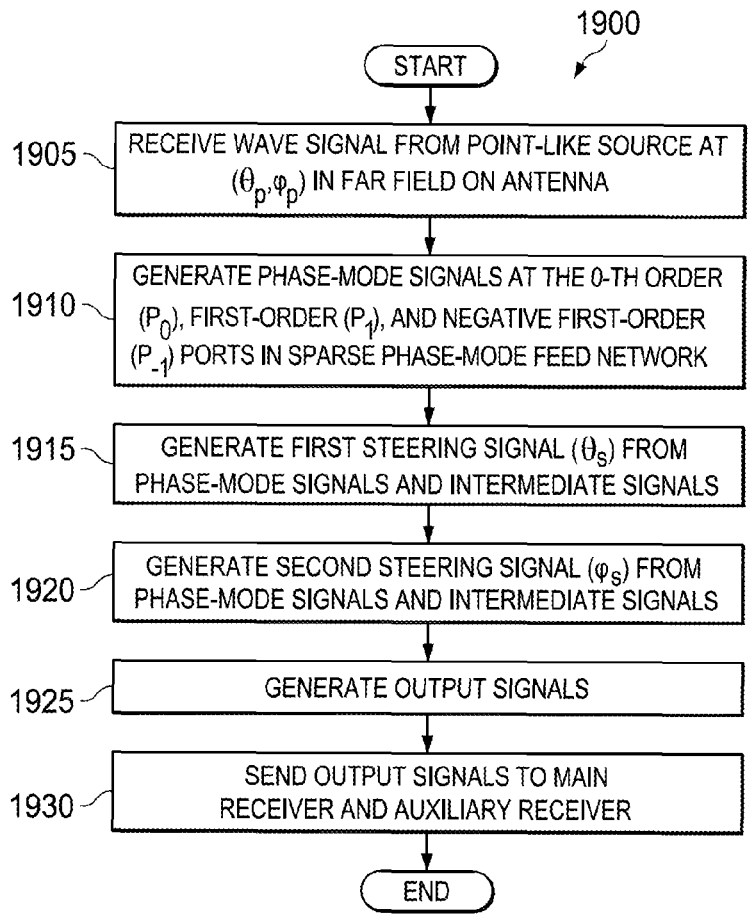
FIG. 19 illustrates a flow diagram of example high-level operations occurring in a beam-steering system as it automatically tracks a signal of interest according to example embodiments described herein.

FIG. 19 illustrates a flow diagram of example high-level operations 1900 occurring in a beam-steering system as it automatically tracks a signal of interest. Operations 1900 may be indicative of operations occurring in a beam-steering system, such as beam-steering system 1700 and beam-steering system 1800, as the beam-steering system tracks a signal of interest.

Operations 1900 may begin with the beam-steering system receiving a signal at its circular ring antenna array (block 1905). The beam-steering system may generate phase-mode signals using its sparse phase-mode feed network (block 1910). The beam-steering system may generate a first steering signal from the phase-mode signals and intermediate signals (block 1915). The beam-steering system may generate a second steering signal from the phase-mode signals and intermediate signals (block 1920). The beam-steering system may generate output signals used by the beam-steering system to track the received signal (block 1925). The beam-steering system may send the output signals to a main receiver, as well as an auxiliary receiver (block 1930).

Figure 20A:
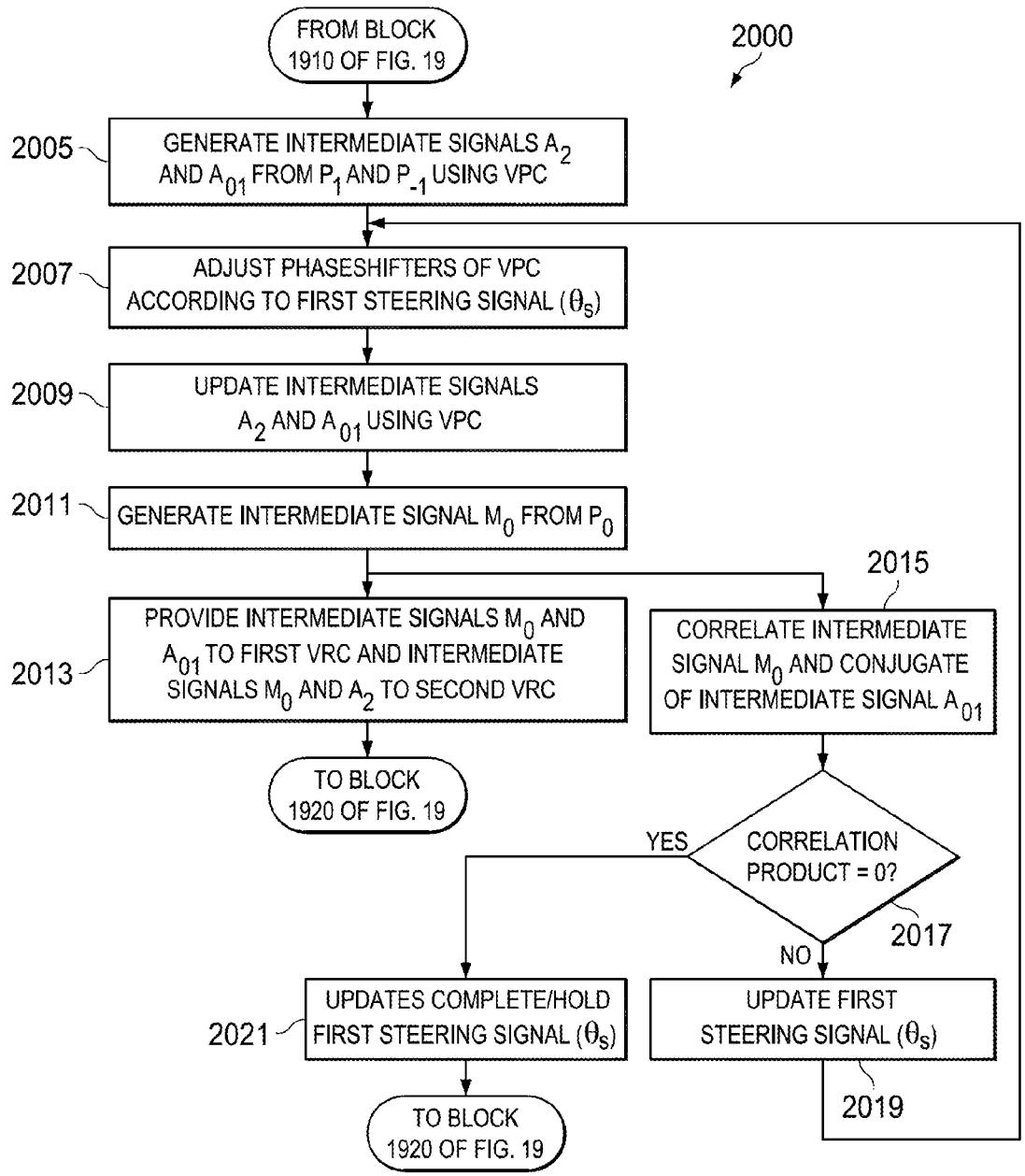
FIG. 20a illustrates a flow diagram of first example operations occurring in a beam-steering system as it generates a first steering signal as it automatically tracks a signal of interest according to example embodiments described herein.

FIG. 20a illustrates a flow diagram of first set of example operations 2000 occurring in a beam-steering system as it generates a first steering signal as it automatically tracks a signal of interest. Operations 2000 may be indicative of operations occurring in a beam-steering system, such as a beam-steering system 1800, as the beam-steering system tracks a signal of interest. The steps illustrated in FIG. 20 should be understood to represent an example embodiment of how step 1915 in FIG. 19 could be implemented in an embodiment of a beam-steering system. Accordingly, the method starts at the conclusion of step 1910 in FIG. 19.

Figure 21:
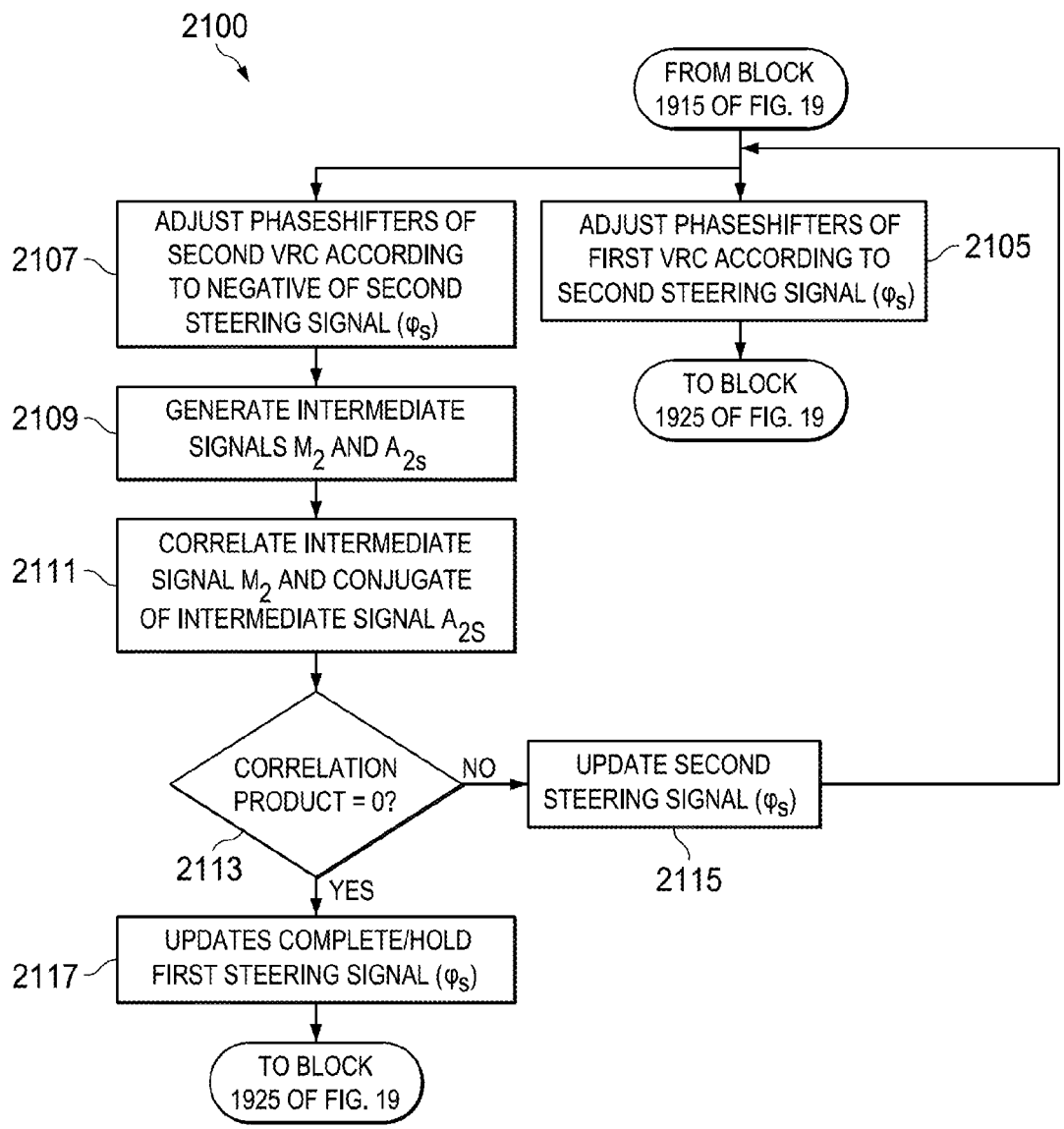
FIG. 21 illustrates a flow diagram of example operations 2100 occurring in a beam-steering system as it generates a second steering signal as it automatically tracks a signal of interest according to example embodiments described herein.

Operations 2000 may begin with the beam-steering system generating intermediate signals $A_2$ and $A_{01}$ from phase-mode signals $P_1$ and $P_{-1}$ using a VPC (block 2005). The beam-steering system may adjust phase-shifters of the VPC using the first steering signal (block 2007). The beam-steering system may update the intermediate signals $A_2$ and $A_{01}$ using the VPC (block 2009). The beam-steering system may also generate intermediate signal $M_0$ from phase-mode signal $P_0$ (block 2011). The beam-steering system may provide the intermediate signals $M_0$ and $A_{01}$ to a first VRC and intermediate signals $M_0$ and $A_2$ to a second VRC (block 2013). Following completion of block 2013, an example process can return to block 1920 in FIG. 19. As will be discussed below, FIG. 21 provides an example embodiment of a method of carrying out block 1920 in FIG. 19, and in some embodiments, following block 2013, the method can continue to step 2105 in FIG. 21.

The beam-steering system may update the first steering signal. The updating of the first steering signal may include correlating the intermediate signal $M_0$ and a conjugate of the intermediate signal $A_{01}$ (block 2015) and performing a check to determine if a correlation product is equal to zero (block 2017). The updating of the first steering signal may also include if the correlation product is not equal to zero (or substantially not equal to zero), updating the first steering signal, e.g., by incrementing the first steering signal by $-\mu^*$ the correlation product (block 2019) and returning to block 2007 to continue the generating of the first steering signal. The updating of the first steering signal may further include if the correlation product is equal to zero (or substantially equal to zero), determining that the first steering signal has converged and the updating of the first steering signal may end with the beam-steering system holding (or hold fixed) the first steering signal (block 2021). The beam-steering system may hold the first steering signal fixed at its converged value. The beam-steering system may hold the first steering signal fixed until the beam-steering system is reset, powered down, or a new signal of interest is to be tracked. Following completion of block 2021, an example process can continue to block 1920 in FIG. 19, the example embodiment of which is shown in FIG. 21.

Figure 20B:
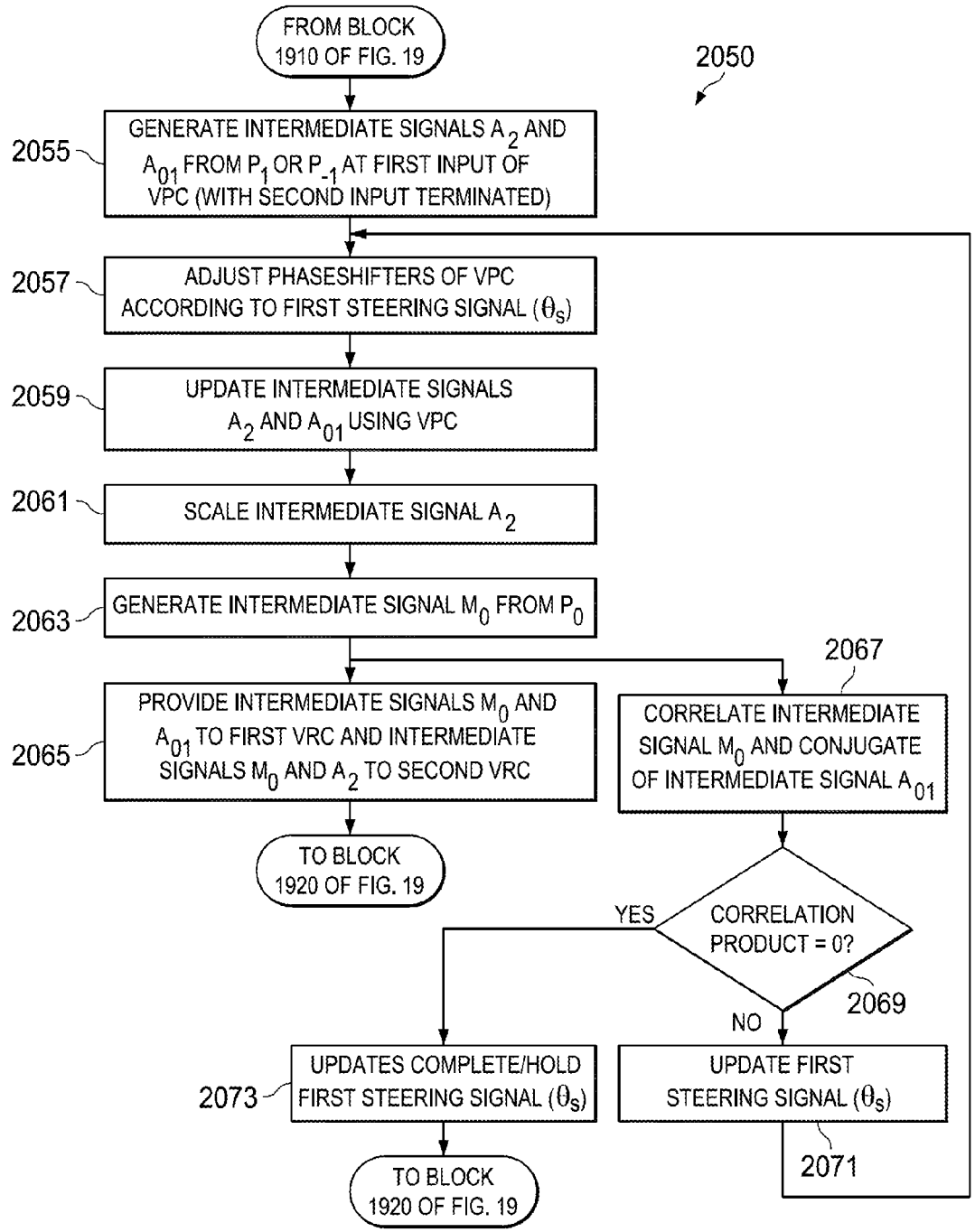
FIG. 20b illustrates a flow diagram of second example operations occurring in a beam-steering system as it generates a first steering signal as it automatically tracks a signal of interest according to example embodiments described herein.

FIG. 20b illustrates a flow diagram of second example operations 2050 occurring in a beam-steering system as it generates a first steering signal as it automatically tracks a signal of interest. Operations 2050 may be indicative of operations occurring in a beam-steering system, such as a beam-steering system 1700, as the beam-steering system tracks a signal of interest. Operations 2050 is an example embodiment of the beam-steering system generating the first steering signal, block 1915 of FIG. 19.

Operations 2000 may begin with the beam-steering system generating intermediate signals $A_2$ and $A_{01}$ from either phase-mode signals $P_1$ or $P_{-1}$ at a first input of a VPC (with a second input of the VPC terminated) (block 2055). The beam-steering system may adjust phase-shifters of the VPC using the first steering signal (block 2057). The beam-steering system may update the intermediate signals $A_2$ and $A_{01}$ using the VPC (block 2059). The beam-steering system may scale the intermediate signal $A_2$ (block 2061). The beam-steering system may also generate intermediate signal $M_0$ from phase-mode signal $P_0$ (block 2063). The beam-steering system may provide the intermediate signals $M_0$ and $A_{01}$ to a first VRC and intermediate signals $M_0$ and $A_2$ (scaled) to a second VRC (block 2065). As discussed with respect to FIG. 20a, completion of the method of FIG. 20b, the process, which is an embodiment of step 1915 can return to step 1920 of FIG. 19, and in some embodiments will serve as the starting point for the method of FIG. 21 in block 2105.

The beam-steering system may update the first steering signal. The updating of the first steering signal may include correlating the intermediate signal $M_0$ and a conjugate of the intermediate signal $A_{01}$ (block 2067) and performing a check to determine if a correlation product is equal to zero (block 2069). The updating of the first steering signal may also include if the correlation product is not equal to zero (or substantially equal to zero), updating the first steering signal, e.g., by incrementing the first steering signal by $-\mu^*$ the correlation product (block 2071) and returning to block 2057 to continue the generating of the first steering signal. The updating of the first steering signal may further include if the correlation product is equal to zero (or substantially equal to zero), determining that the first steering signal has converged and the updating of the first steering signal may end with the beam-steering system holding (or hold fixed) the first steering signal (block 2073). The beam-steering system may hold the first steering signal fixed at its converged value. The beam-steering system may hold the first steering signal fixed until the beam-steering system is reset, powered down, or a new signal of interest is to be tracked. Following completion of block 2073, an example process can continue to block 1920 in FIG. 19, the example embodiment of which is shown in FIG. 21.

It is noted that the termination of operations 2050 may mean that the beam-steering system has completed the generation of the first steering signal, e.g., the beam-steering system has completed block 1915 of FIG. 19, and the beam-steering system may continue with the generation of the second steering signal, e.g., block 1920 of FIG. 19.

FIG. 21 illustrates a flow diagram of example operations 2100 occurring in a beam-steering system as it generates a second steering signal as it automatically tracks a signal of interest. Operations 2100 may be indicative of operations occurring in a beam-steering system, such as beam-steering system 1700 or beam-steering system 1800, as the beam-steering system tracks a signal of interest. Operations 2100 is an example embodiment of the beam-steering system generating the second beam steering signal, block 1920 of FIG. 19.

Operations 2100 may begin with the beam-steering system adjusting phase-shifters of the first VRC using the second steering signal (block 2105). Operations 2100 may terminate.

The beam-steering system may adjust phase-shifters of the second VRC using a negative of the second steering signal (block 2107). The beam-steering system may generate intermediate signals $M_2$ and $A_{2s}$ (block 2109). The beam-steering system may correlate the intermediate signal $M_2$ with a conjugate of the intermediate signal $A_{2s}$ (block 2111). The beam-steering system may perform a check to determine if a correlation product is equal to zero (block 2113). If the correlation product is not equal to zero (or substantially equal to zero), the beam-steering system may update the second steering signal (block 2115). As an illustrative example, the beam-steering system may increment the second steering signal by $-\epsilon^*$ the correlation product. The beam-steering system may also ensure that $\epsilon \ll \mu$. The beam-steering system may return to block 2105 and block 2107. If the correlation product is equal to zero (or substantially equal to zero), the beam-steering system may determine that the second steering signal has converged and the updating of the second steering signal may end with the beam-steering system holding (or hold fixed) the second steering signal (block 2117). The beam-steering system may hold the second steering signal fixed at its converged value. The beam-steering system may hold the second steering signal fixed until the beam-steering system is reset, powered down, or a new signal of interest is to be tracked. Operations 2100 may terminate.

It is noted that the termination of operations 2100 may mean that the beam-steering system has completed the generation of the second steering signal, e.g., the beam-steering system has completed block 1920 of FIG. 19, and the beam-steering system may continue with the generation of the output signals, e.g., block 1925 of FIG. 19.

Although the present disclosure and its advantages have been described in detail, it should be understood that various changes, substitutions and alterations can be made herein without departing from the spirit and scope of the disclosure as defined by the appended claims.

What is claimed is:

1. A method for operating a beam-steering system, the method comprising:
    receiving, by the beam-steering system, a signal to be tracked;
    generating, by the beam-steering system, a first phase-mode signal and a second phase-mode signal;
    generating, by the beam-steering system, a first intermediate auxiliary signal, a second intermediate auxiliary signal, and a first intermediate main signal based on at least the first and second phase-mode signals;
    deriving, by the beam-steering system, a first steering signal proportional to a circumferential steering angle of the received signal from the first intermediate main signal and the first intermediate auxiliary signal; and
    deriving, by the beam-steering system, a second steering signal proportional to a radial steering angle of the received signal from the second intermediate auxiliary signal and the first intermediate main signal.

2. The method of claim 1, wherein deriving the first steering signal comprises:
    correlating a conjugate of the first intermediate auxiliary signal and the first intermediate main signal to produce the first steering signal.

3. The method of claim 1, wherein deriving the first steering signal comprises:
    correlating the first intermediate auxiliary signal and the first intermediate main signal to produce a first correlation product;
    in response to determining that the first correlation product is not equal to zero,
        updating the first steering signal using the first correlation product, and
        repeating the generating the phase-mode signals, the generating the intermediate signals, and the correlating; and
    in response to determining that the first correlation product is equal to zero, saving the first steering signal.

4. The method of claim 1, wherein deriving the second steering signal comprises:
    combining the second intermediate auxiliary signal and the first intermediate main signal to produce a third intermediate auxiliary signal and a second intermediate main signal; and
    correlating the third intermediate auxiliary signal and the second intermediate main signal to produce the second steering signal.

5. The method of claim 1, wherein deriving the second steering signal comprises:
    combining the second intermediate auxiliary signal and the first intermediate main signal to produce a third intermediate auxiliary signal and a second intermediate main signal;
    correlating the second intermediate main signal and a conjugate of the third intermediate auxiliary signal to produce a second correlation product;
    in response to determining that the second correlation product is not equal to zero,
        updating the second steering signal using the second correlation product, and
        repeating the generating the phase-mode signals, the generating the intermediate signals, the combining, and the correlating; and
    in response to determining that the second correlation product is equal to zero, saving the second steering signal.

6. The method of claim 1, further comprising generating a third phase-mode signal from the received signal; and
    wherein generating the first intermediate auxiliary signal, the second intermediate auxiliary signal, and the first intermediate main signal comprises:
        oppositely phaseshifting and combining the second phase-mode signal and the third phase-mode signal to produce the first intermediate auxiliary signal and the second intermediate auxiliary signal; and
        scaling by a complex factor the first phase-mode signal to produce the first intermediate main signal.

7. The method of claim 1, wherein generating the first intermediate auxiliary signal, the second intermediate auxiliary signal, and the first intermediate main signal comprises:
    phaseshifting and scaling, by a first complex factor, the second phase-mode signal to produce the first intermediate auxiliary signal;
    phaseshifting and scaling, by a second complex factor, the second phase-mode signal to produce the second intermediate auxiliary signal, the second complex factor different from the first complex factor; and
    scaling by a third complex factor the first phase-mode signal to produce the first intermediate main signal.

8. The method of claim 1, wherein deriving the first steering signal comprises:
    evaluating $$\frac{d\theta_s}{dt} = -\mu \text{Re}\{M_0 A_{01}^*\} \cong -\mu \frac{|m(t)|^2}{2} \sin(qN\varphi_P)\sin(\theta_p + \theta_s),$$

where $\theta_s$ is an electrical phaseshift proportional to the first steering signal, $\phi_p$ is a radial bearing of a source of the received signal, $\theta_p$ is a circumferential bearing of the source of the received signal, $M_0$ is the first intermediate main signal, $A_{01}$ is the first intermediate auxiliary signal, N is a number of elements in an array of antenna elements, m(t) is a modulation of the signal, $\mu$ is a feedback gain or step-size for the first steering signal, q is a scaling factor in an approximation of a dependence on the radial bearing of the source of the received signal, and Re{.} is a function returning a real portion of an argument.

9. The method of claim 8, further comprising repeating the evaluating until the first steering signal converges so that a negative of the electrical phaseshift $\theta_s$ converges to the circumferential bearing of the source of the received signal, whereupon $$\frac{d\theta_s}{dt} = 0.$$

10. The method of claim 1, wherein deriving the second steering signal comprises:
evaluating $$\frac{d\varphi_s}{dt} = \varepsilon M_2 A_{2s}^* = -\varepsilon \frac{|m(t)|^2}{4}\sin(2\varphi_s + qN\varphi_p),$$

where $\phi_s$ is an electrical phaseshift proportional to the second steering signal, $\phi_p$ is a radial bearing of a source of the received signal, $M_2$ is a second intermediate main signal, $A_{2s}$ is a third intermediate auxiliary signal, N is a number of elements in an array of antenna elements, m(t) is a modulation of the signal, $\epsilon$ is a feedback gain or step-size for the second steering signal and is smaller than a feedback gain or step-size $\mu$ for the first steering signal, and q is a scaling factor in an approximation of a dependence on the radial bearing of the source of the received signal.

11. The method of claim 10, further comprising repeating the evaluating until the second steering signal converges so that a negative of the electrical phaseshift $\phi_s$ converges to qN/2 times the radial bearing of the source of the received signal, whereupon $$\frac{d\varphi_s}{dt} = 0.$$

12. A method for operating a beam-steering system, the method comprising:
generating, by the beam-steering system, a first auxiliary intermediate signal and a second auxiliary intermediate signal based on at least a 1-st order phase-mode signal;
generating, by the beam-steering system, a first intermediate main signal based on at least a 0-th order phase-mode signal;
producing, by the beam-steering system, a first steering signal based on at least the first auxiliary intermediate signal and the first intermediate main signal to orient an array of antenna elements towards a source of the phase-mode signals in a circumferential dimension;
producing, by the beam-steering system, a third intermediate auxiliary signal and a second intermediate main signal based on at least the first intermediate main signal and the second intermediate auxiliary signal;
producing, by the beam-steering system, a second steering signal based on at least the third intermediate auxiliary signal and the second intermediate main signal to orient the array of antenna elements towards the source of the phase-mode signals in a radial dimension; and
producing, by the beam-steering system, an output signal based on at least the first intermediate auxiliary signal, the first intermediate main signal, and the second steering signal, the output signal corresponding to a maximum strength of the signal received by the array of antenna elements.

13. The method of claim 12, further comprising generating the second auxiliary intermediate signal based on at least the 1-st order phase-mode signal and a scaling factor.

14. The method of claim 13, wherein the scaling factor is a 2.

15. The method of claim 12, further comprising generating the first auxiliary intermediate signal and the second auxiliary intermediate signal based on at least the 1-st order phase-mode signal and a −1-st order phase-mode signal.

16. The method of claim 12, further comprising producing an output auxiliary signal based on at least the 1-st order phase-mode signal and a −1st order phase-mode signal, the first intermediate auxiliary signal, the second intermediate auxiliary signal, the first intermediate main signal, the first steering signal, and the second steering signal.

17. A beam-steering control system comprising:
a variable phase combiner configured to generate a first auxiliary intermediate signal and a second auxiliary intermediate signal based on at least one of a 1-st order phase-mode signal or a −1-st order phase-mode signal associated with a received signal;
a phase shifting splitter configured to generate a first intermediate main signal based on at least a 0-th order phase-mode signal associated with the received signal;
a first zero-lag correlator operatively coupled to the first auxiliary intermediate signal and the first intermediate main signal, the first zero-lag correlator configured to produce a first steering signal to orient an array of antenna elements towards a source of the received signal in a circumferential dimension;
a second variable ratio combiner operatively coupled to the first intermediate main signal and the second intermediate auxiliary signal, the second variable ratio combiner configured to produce a third intermediate auxiliary signal and a second intermediate main signal;
a second zero-lag correlator operatively coupled to the third intermediate auxiliary signal and the second intermediate main signal, the second zero-lag correlator configured to produce a second steering signal to orient the array of antenna elements towards the source of the received signal in a radial dimension; and
a first variable ratio combiner operatively coupled to the first intermediate auxiliary signal, the first intermediate main signal, and the second steering signal, the first variable ratio combiner configured to produce an output signal corresponding to a maximum strength of the signal received by the array of antenna elements.

18. The beam-steering control system of claim 17, wherein the variable phase combiner is configured to generate the first auxiliary intermediate signal based on at least the 1-st order phase-mode signal, and to generate the second auxiliary intermediate signal based on at least the 1-st order phase-mode signal and a scaling factor.

19. The beam-steering control system of claim 18, wherein the scaling factor is a 2.

20. The beam-steering control system of claim 17, wherein:
the variable phase combiner is configured to generate the first auxiliary intermediate signal based on at least the −1-st order phase-mode signal; and
the first zero-lag correlator is configured to direct the generated first steering signal to an inverter prior to use as a control signal for the variable phase combiner.

21. The beam-steering control system of claim 17, wherein the first zero-lag correlator comprises a first zero-lag correlator, and the second zero-lag correlator comprises a second zero-lag correlator.

22. The beam-steering control system of claim 17, further comprising the array of antenna elements coupled to the variable phase combiner.

23. The beam-steering control system of claim 22, wherein the array of antenna elements is one of a circular array of antenna elements, a substantially circular array of antenna elements, a polygonal array of antenna elements, a plurality of antenna elements arranged in one or more concentric rings, or a plurality of antenna elements in a common ring array.

24. A beam-steering control system comprising:
an array of antenna elements configured to receive a signal to be tracked;
a phase-mode feed network operatively coupled to the array of antenna elements, the phase-mode feed network configured to generate a first phase-mode signal, a second phase-mode signal and a third phase-mode signal from the received signal;
a variable-phase combiner/splitter (VPC) operatively coupled to the phase-mode feed network, the VPC configured to generate a first intermediate auxiliary signal, a second intermediate auxiliary signal, and a first intermediate main signal based on at least the phase-mode signals;
a first zero-lag correlator operatively coupled to the VPC, the first zero-lag correlator configured to derive a first steering signal proportional to a circumferential steering angle of the received signal from the first intermediate main signal and the first intermediate auxiliary signal; and
a second zero-lag correlator operatively coupled to the VPC, the second zero-lag correlator configured to derive a second steering signal proportional to a radial steering angle of the received signal from the second intermediate auxiliary signal and the first intermediate main signal.

25. The beam-steering control system of claim 24, wherein the first zero-lag correlator is configured to correlate a conjugate of the first intermediate auxiliary signal and the first intermediate main signal to produce the first steering signal.

26. The beam-steering control system of claim 24, wherein the first zero-lag correlator is configured to correlate the first intermediate auxiliary signal and the first intermediate main signal to produce a first correlation product, wherein in response to determining that the first correlation product is not equal to zero, the first zero-lag correlator is configured to update the first steering signal using the first correlation product, and to repeat the deriving the first steering signal, and wherein in response to determining that the first correlation product is equal to zero, the first zero-lag correlator is configured to hold fixed the first steering signal.

27. The beam-steering control system of claim 24, wherein the second zero-lag correlator is configured to combine the second intermediate auxiliary signal and the first intermediate main signal to produce a third intermediate auxiliary signal and a second intermediate main signal, and to correlate the second intermediate main signal and a conjugate of the third intermediate auxiliary signal to produce a second correlation product, wherein in response to determining that the second correlation product is not equal to zero, the second zero-lag correlator is configured to update the second steering signal using the second correlation product, and to repeat the deriving of the second steering signal, and wherein in response to determining that the second correlation product is equal to zero, the second zero-lag correlator is configured to hold fixed the second steering signal.

28. The beam-steering control system of claim 24, wherein the VPC is configured to oppositely phaseshift and combine the second phase-mode signal and the third phase-mode signal to produce the first intermediate auxiliary signal and the second intermediate auxiliary signal, and to scale by a complex factor the first phase-mode signal to produce the first intermediate main signal.

29. The beam-steering control system of claim 24, wherein the first zero-lag correlator is configured to evaluate $$\frac{d\theta_s}{dt} = -\mu \mathrm{Re}\{M_0 \underline{A_{01}^*}\} \cong -\mu \frac{|m(t)|^2}{2} \sin(qN\varphi_P)\sin(\theta_p + \theta_s),$$

where $\theta_s$ is an electrical phaseshift proportional to the first steering signal, $\phi_p$ is a radial bearing of a source of the received signal, $\theta_p$ is a circumferential bearing of a source of the received signal, $M_0$ is the first intermediate main signal, $A_{01}$ is the first intermediate auxiliary signal, N is a number of elements in an array of antenna elements, m(t) is a modulation of the signal, $\mu$ is a feedback gain or step-size for the first steering signal, q is a scaling factor in an approximation of a dependence on the radial bearing of the source of the received signal, and Re{.} is a function returning a real portion of an argument.

30. The beam-steering control system of claim 24, wherein the second zero-lag correlator is configured to evaluate $$\frac{d\varphi_s}{dt} = \varepsilon M_2 \underline{A_{2s}^*} = -\varepsilon \frac{|m(t)|^2}{2} \sin(2\varphi_s + qN\varphi_p),$$

where $\phi_s$ is an electrical phaseshift proportional to the second steering signal, $\phi_p$ is a radial bearing of a source of the received signal, $M_2$ is a second intermediate main signal, $A_{2s}$ is a third intermediate auxiliary signal, N is a number of elements in an array of antenna elements, m(t) is a modulation of the signal, $\epsilon$ is a feedback gain or step-size for the second steering signal and is smaller than a feedback gain or step-size $\mu$ for the first steering signal, and q is a scaling factor in an approximation of a dependence on the radial bearing of the source of the received signal.

* * * * *